(12) United States Patent
Kersey et al.

(10) Patent No.: US 7,604,173 B2
(45) Date of Patent: Oct. 20, 2009

(54) HOLOGRAPHICALLY ENCODED ELEMENTS FOR MICROARRAY AND OTHER TAGGING LABELING APPLICATIONS, AND METHOD AND APPARATUS FOR MAKING AND READING THE SAME

(75) Inventors: Alan Kersey, South Glastonbury, CT (US); John A. Moon, Wallingford, CT (US); Martin A. Putnam, Cheshire, CT (US)

(73) Assignee: Illumina, Inc., San Diego, CA (US)

( * ) Notice: Subject to any disclaimer, the term of this patent is extended or adjusted under 35 U.S.C. 154(b) by 733 days.

(21) Appl. No.: 11/281,910

(22) Filed: Nov. 16, 2005

(65) Prior Publication Data

US 2006/0118630 A1 Jun. 8, 2006

Related U.S. Application Data

(60) Provisional application No. 60/628,827, filed on Nov. 16, 2004.

(51) Int. Cl.
*G06K 7/10* (2006.01)
(52) U.S. Cl. .................................. 235/462.01
(58) Field of Classification Search .......... 235/454, 235/462.01; 369/103
See application file for complete search history.

(56) References Cited

U.S. PATENT DOCUMENTS

| | | | |
|---|---|---|---|
| 3,614,193 A | 10/1971 | Beiser | |
| 3,858,979 A | 1/1975 | Elbe | |
| 3,880,497 A | 4/1975 | Bryngdahl | |
| 3,891,302 A | 6/1975 | Dabby et al. | |
| 3,903,415 A | 9/1975 | Holzapfel | |
| 3,916,182 A | 10/1975 | Dabby et al | |
| 3,968,476 A | 7/1976 | McMahon | |
| 4,011,435 A | 3/1977 | Phelps et al. | |

(Continued)

FOREIGN PATENT DOCUMENTS

CH 598661 A 5/1978

(Continued)

OTHER PUBLICATIONS

"Electronically Scanned Confocal Imaging System"; IBM Technical Disclosure Bulletin; vol. 36; No. 06B, Jun. 1993; pp. 261-262.

(Continued)

*Primary Examiner*—Daniel A Hess
(74) *Attorney, Agent, or Firm*—Small Patent Law Group; Dean D. Small; Jason P. Gross

(57) ABSTRACT

A method and apparatus is provided for writing a code on an optical element, wherein the code is written on the optical element in the form of a holographic image of an n-dimensional code generated by an interference pattern between a reference beam and a signal beam reflected off a spatial light modulation device having the n-dimensional code configured thereon. The method includes steps of generating the interference pattern between the reference beam and the signal beam reflected off the spatial light modulation device having the n-dimensional code thereon; as well as writing the interference pattern on the optical element as a holographic image of the n-dimensional code.

42 Claims, 11 Drawing Sheets

U.S. PATENT DOCUMENTS

| | | |
|---|---|---|
| 4,023,010 A | 5/1977 | Horst et al. |
| 4,053,228 A | 10/1977 | Schiller |
| 4,053,433 A | 10/1977 | Lee |
| 4,131,337 A | 12/1978 | Moraw et al. |
| 4,168,146 A | 9/1979 | Grubb et al. |
| 4,301,139 A | 11/1981 | Feingers et al. |
| 4,386,274 A | 5/1983 | Altshuler |
| 4,400,616 A | 8/1983 | Chevillat et al. |
| 4,445,229 A | 4/1984 | Tasto et al. |
| 4,447,546 A | 5/1984 | Hirschfeld |
| 4,537,504 A | 8/1985 | Baltes et al. |
| 4,560,881 A | 12/1985 | Briggs |
| 4,562,157 A | 12/1985 | Lowe et al. |
| 4,647,544 A | 3/1987 | Nicoli et al. |
| 4,678,752 A | 7/1987 | Thorne et al. |
| 4,685,480 A | 8/1987 | Eck |
| 4,688,240 A | 8/1987 | Hosemann |
| 4,690,907 A | 9/1987 | Hibino et al. |
| 4,701,754 A | 10/1987 | Provonchee |
| 4,716,121 A | 12/1987 | Block et al. |
| 4,725,110 A | 2/1988 | Glenn et al. |
| 4,740,468 A | 4/1988 | Weng et al. |
| 4,740,688 A | 4/1988 | Edwards |
| 4,748,110 A | 5/1988 | Paul |
| 4,762,420 A | 8/1988 | Bowley |
| 4,767,719 A | 8/1988 | Finlan |
| 4,770,295 A | 9/1988 | Carveth et al. |
| 4,807,950 A | 2/1989 | Glenn et al. |
| 4,815,027 A | 3/1989 | Tokumitsu |
| 4,816,659 A | 3/1989 | Bianco et al. |
| 4,822,746 A | 4/1989 | Walt |
| 4,841,140 A | 6/1989 | Sullivan et al. |
| 4,877,747 A | 10/1989 | Stewart |
| 4,880,752 A | 11/1989 | Keck et al. |
| 4,882,288 A | 11/1989 | North et al. |
| 4,921,805 A | 5/1990 | Gebeyehu et al. |
| 4,931,384 A | 6/1990 | Layton et al. |
| 4,937,048 A | 6/1990 | Sakai et al. |
| 4,958,376 A | 9/1990 | Leib |
| 4,992,385 A | 2/1991 | Godfrey |
| 5,002,867 A | 3/1991 | Macevicz |
| 5,003,600 A | 3/1991 | Deason et al. |
| RE33,581 E | 4/1991 | Nicoli et al. |
| 5,028,545 A | 7/1991 | Soini |
| 5,030,558 A | 7/1991 | Litman et al. |
| 5,033,826 A | 7/1991 | Kolner |
| 5,065,008 A | 11/1991 | Hakamata et al. |
| 5,067,155 A | 11/1991 | Bianco et al. |
| 5,081,012 A | 1/1992 | Flanagan et al. |
| 5,089,387 A | 2/1992 | Tsay et al. |
| 5,090,807 A | 2/1992 | Tai |
| 5,091,636 A | 2/1992 | Takada et al. |
| 5,095,194 A | 3/1992 | Barbanell |
| 5,100,238 A | 3/1992 | Nailor et al. |
| 5,104,209 A | 4/1992 | Hill et al. |
| 5,105,305 A | 4/1992 | Betzig et al. |
| 5,114,864 A | 5/1992 | Walt |
| 5,115,121 A | 5/1992 | Bianco et al. |
| 5,118,608 A | 6/1992 | Layton et al. |
| 5,129,974 A | 7/1992 | Aurenius |
| 5,138,468 A | 8/1992 | Barbanell |
| 5,141,848 A | 8/1992 | Donovan et al. |
| 5,143,853 A | 9/1992 | Walt |
| 5,144,461 A | 9/1992 | Horan |
| 5,160,701 A | 11/1992 | Brown, III et al. |
| 5,166,813 A | 11/1992 | Metz |
| 5,192,980 A | 3/1993 | Dixon et al. |
| 5,196,350 A | 3/1993 | Backman et al. |
| 5,200,794 A | 4/1993 | Nishiguma et al. |
| 5,218,594 A | 6/1993 | Tanno |
| 5,239,178 A | 8/1993 | Dernderinger et al. |
| 5,244,636 A | 9/1993 | Walt et al. |
| 5,283,777 A | 2/1994 | Tanno et al. |
| 5,291,006 A | 3/1994 | Nishiguma et al. |
| 5,291,027 A | 3/1994 | Kita et al. |
| 5,300,764 A | 4/1994 | Hoshino et al. |
| 5,307,332 A | 4/1994 | Tinet |
| 5,310,686 A | 5/1994 | Sawyers et al. |
| 5,329,352 A | 7/1994 | Jacobsen |
| 5,342,790 A | 8/1994 | Levine et al. |
| 5,349,442 A | 9/1994 | Deason et al. |
| 5,352,582 A | 10/1994 | Lichtenwalter et al. |
| 5,364,797 A | 11/1994 | Olson et al. |
| 5,367,588 A | 11/1994 | Hill et al. |
| 5,372,783 A | 12/1994 | Lackie |
| 5,374,816 A | 12/1994 | Bianco |
| 5,374,818 A | 12/1994 | Bianco et al. |
| 5,388,173 A | 2/1995 | Glenn |
| 5,394,234 A | 2/1995 | Bianco et al. |
| 5,395,558 A | 3/1995 | Tsai |
| 5,426,297 A | 6/1995 | Dunphy et al. |
| 5,432,329 A | 7/1995 | O'Boyle et al. |
| 5,442,433 A | 8/1995 | Hoshino et al. |
| 5,448,659 A | 9/1995 | Tsutsui et al. |
| 5,451,528 A | 9/1995 | Raymoure et al. |
| 5,455,178 A | 10/1995 | Fattinger |
| 5,461,475 A | 10/1995 | Lerner et al. |
| 5,465,176 A | 11/1995 | Bianco et al. |
| 5,468,649 A | 11/1995 | Shah et al. |
| 5,506,674 A | 4/1996 | Inoue et al. |
| 5,514,785 A | 5/1996 | Van Ness et al. |
| 5,528,045 A | 6/1996 | Hoffman et al. |
| 5,547,849 A | 8/1996 | Baer et al. |
| 5,559,613 A | 9/1996 | Deveaud-Pledran et al. |
| 5,585,639 A | 12/1996 | Dorsel et al. |
| 5,587,832 A | 12/1996 | Krause |
| 5,607,188 A | 3/1997 | Bahns et al. |
| 5,610,287 A | 3/1997 | Nikiforov et al. |
| 5,620,853 A | 4/1997 | Smethers et al. |
| 5,621,515 A | 4/1997 | Hoshino |
| 5,624,850 A | 4/1997 | Kumar et al. |
| 5,625,472 A | 4/1997 | Mizrahi et al. |
| 5,627,040 A | 5/1997 | Bierre et al. |
| 5,627,663 A | 5/1997 | Horan et al. |
| 5,633,724 A | 5/1997 | King et al. |
| 5,633,790 A | 5/1997 | Gritter et al. |
| 5,633,975 A | 5/1997 | Gary et al. |
| 5,667,976 A | 9/1997 | Van Ness et al. |
| 5,671,308 A | 9/1997 | Inoue et al. |
| 5,682,244 A | 10/1997 | Barlow et al. |
| 5,712,912 A | 1/1998 | Tomko et al. |
| 5,721,435 A | 2/1998 | Troll |
| 5,729,365 A | 3/1998 | Sweatt |
| 5,736,330 A | 4/1998 | Fulton |
| 5,742,432 A | 4/1998 | Bianco |
| 5,745,615 A | 4/1998 | Atkins et al. |
| 5,745,617 A | 4/1998 | Starodubov et al. |
| 5,759,778 A | 6/1998 | Li et al. |
| 5,760,961 A | 6/1998 | Tompkin et al. |
| 5,766,956 A | 6/1998 | Groger et al. |
| 5,771,251 A | 6/1998 | Kringlebotn et al. |
| 5,776,694 A | 7/1998 | Sheiness et al. |
| 5,793,502 A | 8/1998 | Bianco et al. |
| 5,798,273 A | 8/1998 | Shuler et al. |
| 5,799,231 A | 8/1998 | Gates et al. |
| 5,801,857 A | 9/1998 | Heckenkamp et al. |
| 5,804,384 A | 9/1998 | Muller et al. |
| 5,812,272 A | 9/1998 | King et al. |
| 5,824,472 A | 10/1998 | Betlach et al. |
| 5,824,478 A | 10/1998 | Muller |
| 5,824,557 A | 10/1998 | Burke et al. |
| 5,830,622 A | 11/1998 | Canning et al. |
| 5,831,698 A | 11/1998 | Depp et al. |
| 5,837,475 A | 11/1998 | Dorsel et al. |

| Patent | Kind | Date | Inventor |
|---|---|---|---|
| 5,837,552 | A | 11/1998 | Cotton et al. |
| 5,841,555 | A | 11/1998 | Bianco et al. |
| 5,846,737 | A | 12/1998 | Kang |
| 5,874,187 | A | 2/1999 | Colvin et al. |
| 5,881,197 | A | 3/1999 | Dong et al. |
| 5,895,750 | A | 4/1999 | Mushahwar et al. |
| 5,922,550 | A | 7/1999 | Everhart et al. |
| 5,922,617 | A | 7/1999 | Wang et al. |
| 5,925,562 | A | 7/1999 | Nova et al. |
| 5,925,878 | A | 7/1999 | Challener |
| 5,945,679 | A | 8/1999 | Dorsel et al. |
| 5,972,542 | A | 10/1999 | Starodubov |
| 5,976,896 | A | 11/1999 | Kumar et al. |
| 5,981,166 | A | 11/1999 | Mandecki |
| 5,986,838 | A | 11/1999 | Thomas, III |
| 5,989,923 | A | 11/1999 | Lowe et al. |
| 5,992,742 | A | 11/1999 | Sullivan |
| 5,998,796 | A | 12/1999 | Liu et al. |
| 6,001,510 | A | 12/1999 | Meng et al. |
| 6,005,691 | A | 12/1999 | Grot et al. |
| 6,017,754 | A | 1/2000 | Chesnut et al. |
| 6,025,129 | A | 2/2000 | Nova et al. |
| 6,025,283 | A | 2/2000 | Roberts |
| 6,027,694 | A | 2/2000 | Boulton et al. |
| 6,030,581 | A | 2/2000 | Virtanen |
| 6,035,082 | A | 3/2000 | Murphy et al. |
| 6,036,807 | A | 3/2000 | Brongers |
| 6,043,880 | A | 3/2000 | Andrews et al. |
| 6,046,925 | A | 4/2000 | Tsien et al. |
| 6,049,727 | A | 4/2000 | Crothall |
| 6,057,107 | A | 5/2000 | Fulton |
| 6,060,256 | A | 5/2000 | Everhart et al. |
| 6,067,167 | A | 5/2000 | Atkinson et al. |
| 6,067,392 | A | 5/2000 | Wakami et al. |
| 6,078,048 | A | 6/2000 | Stevens et al. |
| 6,084,995 | A | 7/2000 | Clements et al. |
| 6,087,186 | A | 7/2000 | Cargill et al. |
| 6,096,496 | A | 8/2000 | Frankel |
| 6,096,596 | A | 8/2000 | Gonzalez |
| 6,097,485 | A | 8/2000 | Lievan |
| 6,103,535 | A | 8/2000 | Pilevar et al. |
| 6,118,127 | A | 9/2000 | Liu et al. |
| 6,128,077 | A | 10/2000 | Jovin et al. |
| 6,137,931 | A | 10/2000 | Ishikawa et al. |
| 6,143,247 | A | 11/2000 | Sheppard, Jr. et al. |
| 6,156,501 | A | 12/2000 | McGall et al. |
| 6,159,748 | A | 12/2000 | Hechinger |
| 6,160,240 | A | 12/2000 | Momma et al. |
| 6,160,656 | A | 12/2000 | Mossberg et al. |
| 6,164,548 | A | 12/2000 | Curiel |
| 6,165,592 | A | 12/2000 | Berger et al. |
| 6,165,648 | A | 12/2000 | Colvin et al. |
| 6,174,648 | B1 | 1/2001 | Terao et al. |
| 6,194,563 | B1 | 2/2001 | Cruickshank |
| 6,204,969 | B1 | 3/2001 | Jang |
| 6,214,560 | B1 | 4/2001 | Yguerabide et al. |
| 6,218,194 | B1 | 4/2001 | Lyndin et al. |
| 6,221,579 | B1 | 4/2001 | Everhart et al. |
| 6,229,635 | B1 | 5/2001 | Wulf |
| 6,229,827 | B1 | 5/2001 | Fernald et al. |
| 6,229,941 | B1 | 5/2001 | Yoon et al. |
| 6,242,056 | B1 | 6/2001 | Spencer et al. |
| 6,259,450 | B1 | 7/2001 | Chiabrera et al. |
| 6,268,128 | B1 | 7/2001 | Collins et al. |
| 6,277,628 | B1 | 8/2001 | Johann et al. |
| 6,284,459 | B1 | 9/2001 | Nova et al. |
| 6,285,806 | B1 | 9/2001 | Kersey et al. |
| 6,288,220 | B1 | 9/2001 | Kambara et al. |
| 6,292,282 | B1 | 9/2001 | Mossberg et al. |
| 6,292,319 | B1 | 9/2001 | Thomas, III |
| 6,301,047 | B1 | 10/2001 | Hoshino et al. |
| 6,304,263 | B1 | 10/2001 | Chiabrera et al. |
| 6,306,587 | B1 | 10/2001 | Royer et al. |
| 6,309,601 | B1 | 10/2001 | Juncosa et al. |
| 6,312,961 | B1 | 11/2001 | Voirin et al. |
| 6,313,771 | B1 | 11/2001 | Munroe et al. |
| 6,314,220 | B1 | 11/2001 | Mossberg et al. |
| 6,319,668 | B1 | 11/2001 | Nova et al. |
| 6,321,007 | B1 | 11/2001 | Sanders |
| 6,322,932 | B1 | 11/2001 | Colvin et al. |
| RE37,473 | E | 12/2001 | Challener |
| 6,329,963 | B1 | 12/2001 | Chiabrera et al. |
| 6,331,273 | B1 | 12/2001 | Nova et al. |
| 6,340,588 | B1 | 1/2002 | Nova et al. |
| 6,352,854 | B1 | 3/2002 | Nova et al. |
| 6,355,198 | B1 | 3/2002 | Kim et al. |
| 6,355,432 | B1 | 3/2002 | Fodor et al. |
| 6,356,681 | B1 | 3/2002 | Chen et al. |
| 6,359,734 | B1 | 3/2002 | Staub et al. |
| 6,361,958 | B1 | 3/2002 | Shieh et al. |
| 6,363,097 | B1 | 3/2002 | Linke et al. |
| 6,371,370 | B2 | 4/2002 | Sadler et al. |
| 6,372,428 | B1 | 4/2002 | Nova et al. |
| 6,383,754 | B1 | 5/2002 | Kaufman et al. |
| 6,391,562 | B2 | 5/2002 | Kambara et al. |
| 6,395,558 | B1 | 5/2002 | Duveneck et al. |
| 6,399,295 | B1 | 6/2002 | Kaylor et al. |
| 6,399,935 | B1 | 6/2002 | Jovin et al. |
| 6,403,320 | B1 | 6/2002 | Read et al. |
| 6,406,841 | B1 | 6/2002 | Lee et al. |
| 6,406,848 | B1 | 6/2002 | Bridgham et al. |
| 6,416,714 | B1 | 7/2002 | Nova et al. |
| 6,416,952 | B1 | 7/2002 | Pirrung et al. |
| 6,417,010 | B1 | 7/2002 | Cargill et al. |
| 6,424,056 | B1 | 7/2002 | Irvin |
| 6,428,707 | B1 | 8/2002 | Berg et al. |
| 6,428,957 | B1 | 8/2002 | Delenstarr |
| 6,429,022 | B1 | 8/2002 | Kunz et al. |
| 6,433,849 | B1 | 8/2002 | Lowe |
| 6,436,651 | B1 | 8/2002 | Everhart et al. |
| 6,440,667 | B1 | 8/2002 | Fodor et al. |
| 6,456,762 | B1 | 9/2002 | Nishiki et al. |
| RE37,891 | E | 10/2002 | Collins et al. |
| 6,462,770 | B1 | 10/2002 | Cline et al. |
| 6,489,606 | B1 | 12/2002 | Kersey et al. |
| 6,496,287 | B1 | 12/2002 | Seiberle et al. |
| 6,506,342 | B1 | 1/2003 | Frankel |
| 6,514,767 | B1 | 2/2003 | Natan |
| 6,515,753 | B2 | 2/2003 | Maher et al. |
| 6,522,406 | B1 | 2/2003 | Rovira et al. |
| 6,524,793 | B1 | 2/2003 | Chandler et al. |
| 6,533,183 | B2 | 3/2003 | Aasmul et al. |
| 6,542,673 | B1 | 4/2003 | Holter et al. |
| 6,544,739 | B1 | 4/2003 | Fodor et al. |
| 6,545,758 | B1 | 4/2003 | Sandstrom |
| 6,560,017 | B1 | 5/2003 | Bianco |
| 6,565,770 | B1 | 5/2003 | Mayer et al. |
| 6,576,424 | B2 | 6/2003 | Fodor et al. |
| 6,578,712 | B2 | 6/2003 | Lawandy |
| 6,592,036 | B2 | 7/2003 | Sadler et al. |
| 6,594,421 | B1 | 7/2003 | Johnson et al. |
| 6,609,728 | B1 | 8/2003 | Voerman et al. |
| 6,613,581 | B1 | 9/2003 | Wada et al. |
| 6,618,342 | B1 | 9/2003 | Johnson et al. |
| 6,622,916 | B1 | 9/2003 | Bianco |
| 6,628,439 | B2 | 9/2003 | Shiozawa et al. |
| 6,632,655 | B1 | 10/2003 | Mehta et al. |
| 6,635,470 | B1 | 10/2003 | Vann |
| 6,635,863 | B1 | 10/2003 | Nihommori et al. |
| 6,646,243 | B2 | 11/2003 | Pirrung et al. |
| 6,657,758 | B1 | 12/2003 | Garner |
| 6,660,147 | B1 | 12/2003 | Woudenberg et al. |
| 6,678,429 | B2 | 1/2004 | Mossberg et al. |
| RE38,430 | E | 2/2004 | Rosenstein |
| 6,689,316 | B1 | 2/2004 | Blyth et al. |
| 6,692,031 | B2 | 2/2004 | McGrew |

| | | | | | | |
|---|---|---|---|---|---|---|
| 6,692,912 B1 | 2/2004 | Boles et al. | | 2006/0023310 A1 | 2/2006 | Putnam et al. |
| 6,794,658 B2 | 9/2004 | MacAulay | | 2006/0028727 A1 | 2/2006 | Moon et al. |
| 6,806,954 B2 | 10/2004 | Sandstrom | | 2006/0050544 A1* | 3/2006 | Horimai .................. 365/6 |
| 6,858,184 B2 | 2/2005 | Pelrine | | 2006/0057729 A1 | 3/2006 | Moon et al. |
| 6,874,639 B2 | 4/2005 | Lawandy | | 2006/0063271 A1 | 3/2006 | Putnam et al. |
| 6,881,789 B2 | 4/2005 | Bossé | | 2006/0067179 A1* | 3/2006 | Matsumoto et al. ........ 369/47.1 |
| 6,892,001 B2 | 5/2005 | Ohta et al. | | 2006/0071075 A1 | 4/2006 | Moon et al. |
| 6,905,885 B2 | 6/2005 | Colston et al. | | 2006/0072177 A1 | 4/2006 | Putnam et al. |
| 6,908,737 B2 | 6/2005 | Ravkin et al. | | 2006/0118630 A1 | 6/2006 | Kersey et al. |
| 6,919,009 B2 | 7/2005 | Stonas | | 2006/0119913 A1 | 6/2006 | Moon |
| 6,982,996 B1 | 1/2006 | Putnam et al. | | 2006/0132877 A1 | 6/2006 | Kersey |
| 7,045,049 B1 | 5/2006 | Natan | | 2006/0134324 A1 | 6/2006 | Putnam et al. |
| 7,065,032 B2* | 6/2006 | Horimai .................... 369/103 | | 2006/0139635 A1 | 6/2006 | Kersey et al. |
| 7,092,160 B2 | 8/2006 | Putnam et al. | | 2006/0140074 A1* | 6/2006 | Horimai .................. 369/44.28 |
| 7,106,513 B2 | 9/2006 | Moon et al. | | 2006/0160208 A1 | 7/2006 | Putnam et al. |
| 7,126,755 B2 | 10/2006 | Moon et al. | | 2007/0121181 A1 | 5/2007 | Moon et al. |
| 7,215,628 B2* | 5/2007 | Horimai .................... 369/103 | | 2008/0170664 A1 | 7/2008 | Kalman |
| 7,225,082 B1 | 5/2007 | Natan | | 2008/0192311 A1* | 8/2008 | Horimai ..................... 359/11 |
| 7,321,541 B2* | 1/2008 | Horimai .................... 369/103 | | 2009/0040885 A1* | 2/2009 | Horimai .................. 369/30.03 |
| 7,339,148 B2 | 3/2008 | Kawano | | | | |
| 7,349,158 B2 | 3/2008 | Moon | | FOREIGN PATENT DOCUMENTS | | |
| 2001/0007775 A1 | 7/2001 | Seul et al. | | | | |
| 2002/0000471 A1 | 1/2002 | Aasmul et al. | | DE | 2416652 | 10/1975 |
| 2002/0006664 A1 | 1/2002 | Sabatini | | EP | 0 395 300 | 10/1990 |
| 2002/0018430 A1 | 2/2002 | Heckenkamp et al. | | EP | 0 485 803 | 5/1992 |
| 2002/0022273 A1 | 2/2002 | Empedocles et al. | | EP | 0 508 257 | 10/1992 |
| 2002/0025534 A1 | 2/2002 | Goh et al. | | EP | 0 723 149 | 7/1996 |
| 2002/0031783 A1 | 3/2002 | Empedocles | | EP | 0 798 573 A1 | 10/1997 |
| 2002/0034747 A1 | 3/2002 | Bruchez et al. | | EP | 0 911 667 A1 | 4/1999 |
| 2002/0039732 A1 | 4/2002 | Bruchez et al. | | EP | 0 916 981 | 5/1999 |
| 2002/0074513 A1 | 6/2002 | Abel et al. | | EP | 0 972 817 A1 | 1/2000 |
| 2002/0084329 A1 | 7/2002 | Kaye et al. | | EP | 1 182 054 A2 | 2/2002 |
| 2002/0090650 A1 | 7/2002 | Empedocles et al. | | EP | 1 219 979 A1 | 7/2002 |
| 2002/0094528 A1 | 7/2002 | Salafsky | | GB | 2 118 189 | 10/1983 |
| 2002/0097658 A1 | 7/2002 | Worthington et al. | | GB | 2 129 551 | 5/1984 |
| 2002/0155490 A1 | 10/2002 | Skinner et al. | | GB | 2 138 821 | 10/1984 |
| 2002/0174918 A1 | 11/2002 | Fujimura et al. | | GB | 2 299 235 | 9/1996 |
| 2002/0197456 A1 | 12/2002 | Pope | | GB | 2 306 484 | 5/1997 |
| 2003/0008323 A1 | 1/2003 | Ravkin et al. | | GB | 2306484 | 5/1997 |
| 2003/0021003 A1 | 1/2003 | Ono et al. | | GB | 2 319 838 | 6/1998 |
| 2003/0032203 A1 | 2/2003 | Sabatini et al. | | GB | 2 372 100 | 8/2002 |
| 2003/0077038 A1 | 4/2003 | Murashima et al. | | JP | 58143254 A | 8/1983 |
| 2003/0082568 A1 | 5/2003 | Phan | | JP | 08102544 | 4/1986 |
| 2003/0082587 A1 | 5/2003 | Seul et al. | | JP | 01047950 | 2/1989 |
| 2003/0129654 A1 | 7/2003 | Ravkin et al. | | JP | 101660705 | 6/1998 |
| 2003/0138208 A1 | 7/2003 | Pawlak et al. | | JP | 11-119029 | 4/1999 |
| 2003/0142704 A1 | 7/2003 | Lawandy | | JP | 2000-035521 | 2/2000 |
| 2003/0142713 A1 | 7/2003 | Lawandy | | JP | 00249706 | 9/2000 |
| 2003/0153006 A1 | 8/2003 | Washizu et al. | | JP | 200300467 A | 1/2003 |
| 2003/0162296 A1 | 8/2003 | Lawandy | | WO | WO 91/06496 | 5/1991 |
| 2003/0184730 A1 | 10/2003 | Price | | WO | WO 93/09668 | 5/1993 |
| 2003/0203390 A1 | 10/2003 | Kaye et al. | | WO | WO 94/28119 | 12/1994 |
| 2003/0228610 A1 | 12/2003 | Seul | | WO | WO 96/24061 | 8/1996 |
| 2004/0027968 A1* | 2/2004 | Horimai .................... 369/103 | | WO | WO 96/36436 A1 | 11/1996 |
| 2004/0047030 A1 | 3/2004 | MacAuley | | WO | WO 97/12680 | 4/1997 |
| 2004/0062178 A1* | 4/2004 | Horimai .................... 369/103 | | WO | WO 97/15690 | 5/1997 |
| 2004/0075907 A1 | 4/2004 | Moon et al. | | WO | WO 97/17258 | 5/1997 |
| 2004/0100636 A1 | 5/2004 | Somekh et al. | | WO | WO 97/31282 | 8/1997 |
| 2004/0100892 A1* | 5/2004 | Horimai .................... 369/103 | | WO | WO 97/34171 | 9/1997 |
| 2004/0125370 A1 | 7/2004 | Montagu | | WO | WO 98/04740 | 2/1998 |
| 2004/0125424 A1 | 7/2004 | Moon et al. | | WO | WO 98/24549 | 6/1998 |
| 2004/0126875 A1 | 7/2004 | Putnam et al. | | WO | WO 99/02266 | 1/1999 |
| 2004/0132205 A1 | 7/2004 | Moon et al. | | WO | WO 99/09042 | 2/1999 |
| 2004/0156471 A1 | 8/2004 | Sakata | | WO | WO 99/32654 | 7/1999 |
| 2004/0170356 A1 | 9/2004 | Iazikov et al. | | WO | WO 99/42209 | 8/1999 |
| 2004/0175842 A1 | 9/2004 | Roitman et al. | | WO | WO 00/08443 | 2/2000 |
| 2004/0209376 A1 | 10/2004 | Natan et al. | | WO | WO 00/16893 A2 | 3/2000 |
| 2004/0233485 A1 | 11/2004 | Moon et al. | | WO | WO 00/37914 | 6/2000 |
| 2004/0263923 A1 | 12/2004 | Moon et al. | | WO | WO-00/37914 | 6/2000 |
| 2005/0042764 A1 | 2/2005 | Sailor et al. | | WO | WO 00/37969 | 6/2000 |
| 2005/0220408 A1 | 10/2005 | Putnam | | WO | WO-00/37969 | 6/2000 |
| 2005/0227252 A1 | 10/2005 | Moon et al. | | WO | WO 00/39617 | 7/2000 |
| 2005/0270603 A1 | 12/2005 | Putnam et al. | | WO | WO 00/61198 | 10/2000 |

| | | |
|---|---|---|
| WO | WO 01/58583 A1 | 8/2001 |
| WO | WO 01/71322 A2 | 9/2001 |
| WO | WO-01/78889 | 10/2001 |
| WO | WO 01/78889 A2 | 10/2001 |
| WO | WO 01/90225 | 11/2001 |
| WO | WO 02/059306 A2 | 8/2002 |
| WO | WO-02/59306 A2 | 8/2002 |
| WO | WO 02/059603 | 8/2002 |
| WO | WO02064829 | 8/2002 |
| WO | WO 03/061983 | 7/2003 |
| WO | WO03091731 | 11/2003 |
| WO | WO2004011940 | 2/2004 |
| WO | WO2004015418 | 2/2004 |
| WO | WO 2004/019276 A1 | 3/2004 |
| WO | WO 2004/024328 | 3/2004 |
| WO | WO 2004/025561 | 3/2004 |
| WO | WO 2004/025562 | 3/2004 |
| WO | WO 2004/025563 A1 | 3/2004 |
| WO | WO2004046697 | 6/2004 |
| WO | WO 2004/066210 | 8/2004 |
| WO | WO 2005/026729 A3 | 3/2005 |
| WO | WO 2005/027031 A2 | 3/2005 |
| WO | WO 2005/029047 A2 | 3/2005 |
| WO | WO 2005/033681 A1 | 4/2005 |
| WO | WO 2005/050207 A3 | 6/2005 |
| WO | WO 2005/079544 A2 | 9/2005 |
| WO | WO 2006/020363 A2 | 2/2006 |
| WO | WO 2006/055735 A2 | 5/2006 |
| WO | WO 2006/055736 A1 | 5/2006 |
| WO | WO 2006/076053 A1 | 7/2006 |

OTHER PUBLICATIONS

Hideki Kambara; Recent Progress in fluorescent DNA Analyzers and Methods; Current Topics in Analytical checmistry; vol. 1, (1998) pp. 21-36.
G. Kakarantzas et al.; "Transmission Filters Based on periodically Micro-tapered Fibre"; CLE0/2000/Friday Morning; 8:45 a.m.; pp. 574-575.
Michael C. Needels et al.; "Generation and Screening of an Oligonucleotide-Encoded Synthetic Peptide Library"; Proc Natl. Acad. Sci. USA, vol. 90; pp. 10700-10704, Nov. 1993.
W.R. Rigby; "An Anodizing Process for the Production of Inorganic Microfiltration Membranes"; 2436Transactions of the Institute of Metal Finishing;68 Aug. 1990, Part 3 p. 95-98.
Jain KK, Nanodiagnostics: application of nanotechnology in molecular diagnostics, Expert Review of Molecular Diagnostics 3(2):153-161 (2003), XP008038849.
Othonos, X. Lee; Superimposed Multiple Bragg Gratings, Nov. 10, 1994, vol. 30, No. 23.
Po Ki Yuen, Microbarcode Sorting Device; Science & Technology, Corning Incorparated, Corning, New York 14831-0007, USA.
International Search Report and Preliminary Examination Report for International Application No. PCT/US2003/26315.
International Search Report and Written Opinion for International Application No. PCT/US2003/26316.
International Search Report for International Application No. PCT/US2003/28862.
International Search Report for International Application No. PCT/US2003/28874.
International Search Report for International Application No. PCT/US2003/28875.
International Search Report for International Application No. PCT/US2003/28887.
International Search Report for International Application No. PCT/US2003/28890.
International Search Report and Preliminary Examinatoin for International Application No. PCT/US2003/29164.
International Search Report for International Application No. PCT/US2003/29244.
International Search Report and Written Opinion for International Application No. PCT/US2004/01685.
International Search Report and Written Opinion for International Application No. PCT/US2004/30037.
International Search Report and Written Opinion for International Application No. PCT/US2004/30038.
International Search Report and Written Opinion for International Application No. PCT/US2004/30300.
International Search Report and Written Opinion for International Application No. PCT/US2004/32084.
International Search Report and Written Opinion for International Application No. PCT/US2004/38416.
International Search Report and Written Opinion for International Application No. PCT/US2005/05743.
International Search Report and Written Opinion for International Application No. PCT/US2005/05745.
International Search Report and Written Opinion for International Application No. PCT/US2005/26289.
International Search Report and Written Opinion for International Application No. PCT/US2005/33694.
International Search Report and Written Opinion for International Application No. PCT/US2005/41730.
International Search Report and Written Opinion for International Application No. PCT/US2005/41731.
Burstein Technology, Inc.; "Angel Strategies Tombstone"; 1 pg.
Vander Lugt; "Design Relationships For Holographic Memories"; Applied Optics, vol. 12, No. 7, Jul. 1973; pp. 1675-1685.
Andrew Marshall; "DNA Chips: Array of Possibilities"; Nature Biotechnology vol. 16 Jan. 1998; pp. 27-31.
Thomas Laurell; "Enhanced Enzyme Activity in Silicon Integrated Enzyme Reactors Utilizing Porous Silicon as the Coupling Matrix"; Sensor & Actuators B 31(1996); pp. 161-166.
Michael J. Kozal; "Extensive Polymorphisms Observed in HIV-1 Clade B Protease Gene Using High-Density Oligonucleotide Arrays"; Nature Medicine, vol. 2, No. 7, Jul. 1996; pp. 753-759.
Masato Mitsuhashi; "Gene Manipulation on Plastic Plates"; Nature, vol. 357, Jun. 11, 1992; pp. 519-520.
"Ben Beune Patent Licensing Director of Philips IP&S"; Replication & Duplication -News & Technology; Jan.-Feb. 2002; pp. 1-2.
"Compact Disc Arrayer"; V&P Scientific; Nov. 17, 2003; pp. 1-4.
De Beer et al., "Forward-Scattering Degenerate Four-Wave Mixing for Sensitive Absorption Detection in Microseparation Systems Coupling to Micro-Column Liquid Chromatography"; Journal of Chromatography A. 811 (1998); pp. 35-45.
Fonjallaz et al., "Interferometric Side Diffraction Technique for the Characterisation of Fiber Gratings"; 1999 OSA Conference, Sep. 23-25; 3 pgs.
Kashyap R.; "Fiber Bragg Gratings"; Academic Press, Ch. 9; pp. 430-433.
Kogelnik H; "Coupled Wave Theory for Thick Hologram Gratings"; The Bell System Technical Journal, 48(9):2909-2947 (1969).
Krug P., "Measurement of Index Modulation Along an Optical Fiber Bragg Grating"; Optics Letters, 20(17):1767-1769.
Leith et al., "Holographic Data Storage in Three-Dimensional Media"; Applied Optics, vol. 5, No. 8, Aug. 1966; 21 pgs.
Shelia R. Nicerwarner-Peña, "Submicrometer Metallic Barcodes"; Science, vol. 294; Oct. 5, 2001; 5 pgs.
Ivan Oransky; "Sequencing on Compact Disc? Microgenomics of Breast Cancer; Better Binding Site Prediction"; vol. 17 / Issue 13 / 35 / Jun. 30, 2003; 13 pgs.
Mark O. Worthington; "Curriculum Vitae"; Jan. 5, 2004; 4 pgs.
Yoshinobu Kohara; "DNA Probes on Beads Arrayed in a Capillary, 'Bead-Array',Exhibited High Hybridization Performance"; Nucleic Acids Research, 2002, vol. 30, No. 16 e87; 7 pgs.
Patil et al. "Porous Polysterene Beads as Carriers for Self-Emulsifying System Containing Loratadine"; (AAPS PharmSciTech, Mar. 24, 2006, vol. 7, pp. E1-E7).
Lide (CRC Handbook of Chemistry and Physics, 71st ed.).
"Introduction to Flow Cytometry: A Learning Guide," BD Biosciences, San Jose, CA, Apr. 2000.
US 6,780,301, 08/2004, Natan (withdrawn)

* cited by examiner

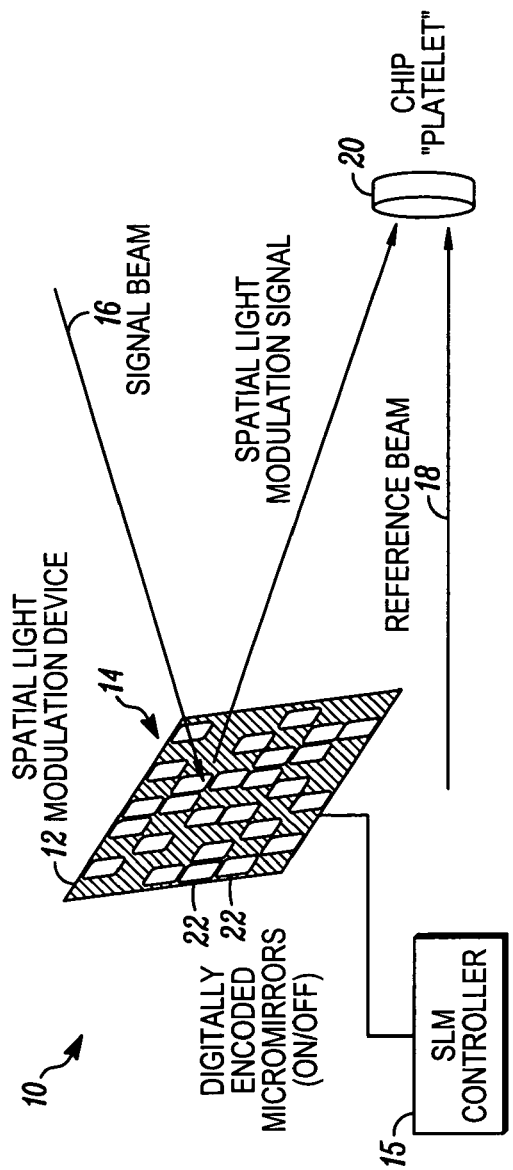
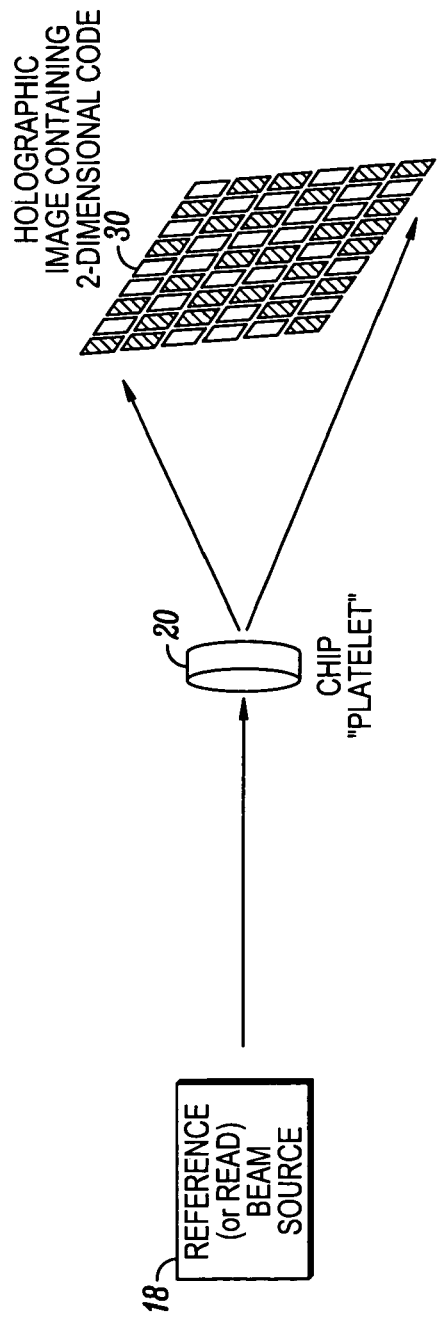

1 X n, 1-DIMENSIONAL CODE, IN TRANSMISSION

MORE THAN ONE SLMs

WRITING HOLOGRAM IN A CHIP

GENERATION OF REFERENCE
AND SIGNAL SOURCE BEAMS

HOLOGRAPHICALLY ENCODED ELEMENTS FOR MICROARRAY AND OTHER TAGGING LABELING APPLICATIONS, AND METHOD AND APPARATUS FOR MAKING AND READING THE SAME

CROSS REFERENCES TO RELATED APPLICATIONS

This application claims benefit to provisional patent application No. 60/628,827, filed Nov. 16, 2004, which is hereby incorporated by reference in their entirety.

The following cases contain subject matter related to that disclosed herein and are incorporated herein by reference in their entirety: U.S. patent application Ser. No. 10/661,234, filed Sep. 12, 2003, entitled "Diffraction Grating-Based Optical Identification Element"; U.S. patent application Ser. No. 10/661,031 filed Sep. 12, 2003, entitled "Diffraction Grating-Based Encoded Micro-particles for Multiplexed Experiments"; U.S. patent application Ser. No. 10/661,082, filed Sep. 12, 2003, entitled "Method and Apparatus for Labeling Using Diffraction Grating-Based Encoded Optical Identification Elements"; U.S. patent application Ser. No. 10/661,115, filed Sep. 12, 2003, entitled "Assay Stick"; U.S. patent application Ser. No. 10/661,836, filed Sep. 12, 2003, entitled "Method and Apparatus for Aligning Microbeads in order to Interrogate the Same"; U.S. patent application Ser. No. 10/661,254, filed Sep. 12, 2003, entitled "Chemical Synthesis Using Diffraction Grating-based Encoded Optical Elements"; U.S. patent application Ser. No. 10/661,116, filed Sep. 12, 2003, entitled "Method of Manufacturing of a Diffraction grating-based identification Element"; and U.S. patent application Ser. No. 10/763,995, filed Jan. 22, 2004, entitled, "Hybrid Random Bead/Chip Based Microarray", U.S. Provisional Patent Applications Ser. Nos. 60/609,583, 60/610,059 and 60/609,712, all filed Sep. 13, 2004; U.S. Provisional Patent Applications Ser. Nos. 60/611,205, 60/610,910, 60/610,833, 60/610,829, 60/610,928, all filed Sep. 17, 2004; U.S. Provisional Patent Application Ser. No. 60/611,676, filed Sep. 20, 2004; and U.S. patent applications Ser. No. 10/956,791, filed Oct. 1, 2004.

BACKGROUND OF THE INVENTION

1. Field of Invention

The present invention relates to a method and apparatus for writing a code on an optical element; and more particularly, for a method and apparatus for writing a 2-dimensional code on a very small optical element in the form of a microbead that may be 1-1000 microns or smaller.

2. Description of Related Art

Tiny microbeads that are individually identifiable have many applications in drug discovery, genomics, chemistry, and security. Microbeads are very small objects, typically 1-1000 microns (um) in feature size. They may be cylindrical, cubic, rectangular, or any other shape. Coded microbeads are individually identifiable. There are many methods available to encode microbeads. Known methods for encoding microbeads include fluorescence intensity and/or color, chemical techniques, spatial marks on the particles and radio-frequency encoding. However, the known ways involve writing a code that is linear which limits the amount of information that can be contained in such a code, which in turn limits the type of applications in which the coded optical elements may be used. In view of this, there is a need in the industry for a better way to encode microbeads to increase the amount of information each microbead contains.

SUMMARY OF INVENTION

In its broadest sense, the present invention provides a new and unique method and apparatus for writing a code on an optical element, such as a microbead, wherein the code is written on the optical element as a holographic image of an n-dimensional code, which may be generated by an interference pattern between a reference beam and a signal beam reflected off a spatial light modulation device having the n-dimensional code configured thereon. After the code is written, the optical element takes the form of a holographically encoded optical element. The n-dimensional code may include a 1-dimensional code, a 2-dimensional code, a 3-dimensional code, etc.

In one embodiment, the method includes the steps of generating the interference pattern between the reference beam and the signal beam reflected off the spatial light modulation device having a 2-dimensional code configured thereon; as well as writing the interference pattern on the optical element as a holographic image of a 2-dimensional code.

The spatial light modulation device may be a digital light processor (DLP) or other suitable digitally modulated device (DMD) having a 1 or 2-dimensional array of micromirrors. In effect, the spatial light modulation device is a digital mask with N×M attenuation elements that allows for multiple combinations/permutations of digital codes. The multiple combinations/permutations of digital codes include M sets of $2^N$ codes, and the total number of unique 2D image codes is $2^{NM}$ codes.

The holographically encoded optical element may take the form of a bead, a chip, a block, a platelet or other suitable geometry. The material may be any photosensitive material, including glass (e.g. silica based glass) and polymer materials having appropriate photosensitivity, that creates a refractive index variation in the substrate.

The holographic image is a hologram, which is a three-dimensional image reproduced from a pattern of interference produced by a split coherent beam of radiation (as a laser). The process for making and reading a hologram is known in the art. In the present invention, the reference beam and the signal beam may be produced by splitting such a coherent beam of radiation using such known optical techniques. By way of example, a reference laser beam would be split to form the signal beam.

The 1 or 2-dimensional code may include a reference marker, e.g. a corner code or the like.

The method may also include the step of providing the reference beam on the optical element in order to read the holographic image off the holographically encoded optical element.

The scope of the invention is intended to include the interference pattern being written in or on the holographically encoded optical element in the form of a Bragg grating or other suitable encoding technique now known or later developed in the future.

The apparatus for writing the code on or in the optical element includes, in combination, the spatial light modulation device having the 1 or 2-dimensional code configured thereon that responds to the signal beam, for providing the spatial light modulation signal containing the 1 or 2-dimensional code; as well as a light source for providing the reference beam. The spatial light modulator and the light source are arranged in relation to the optical element so that the interference pattern generated between the spatial light modulation signal and the reference beam is written on or in the optical element as the holographic image of the 1 or 2-dimensional code.

The present invention also includes the holographically encoded optical element having the n-dimensional code formed or produced by performing the steps set forth using method and apparatus described herein.

BRIEF DESCRIPTION OF THE DRAWING

The drawing, not drawn to scale, includes the following Figures:

FIG. 1 shows a diagram of an apparatus for writing an n-dimensional code on an optical element according to the present invention.

FIG. 2 shows a diagram of an apparatus for reading an n-dimensional code on an optical element according to the present invention.

DETAILED DESCRIPTION OF INVENTION

Figure 3:
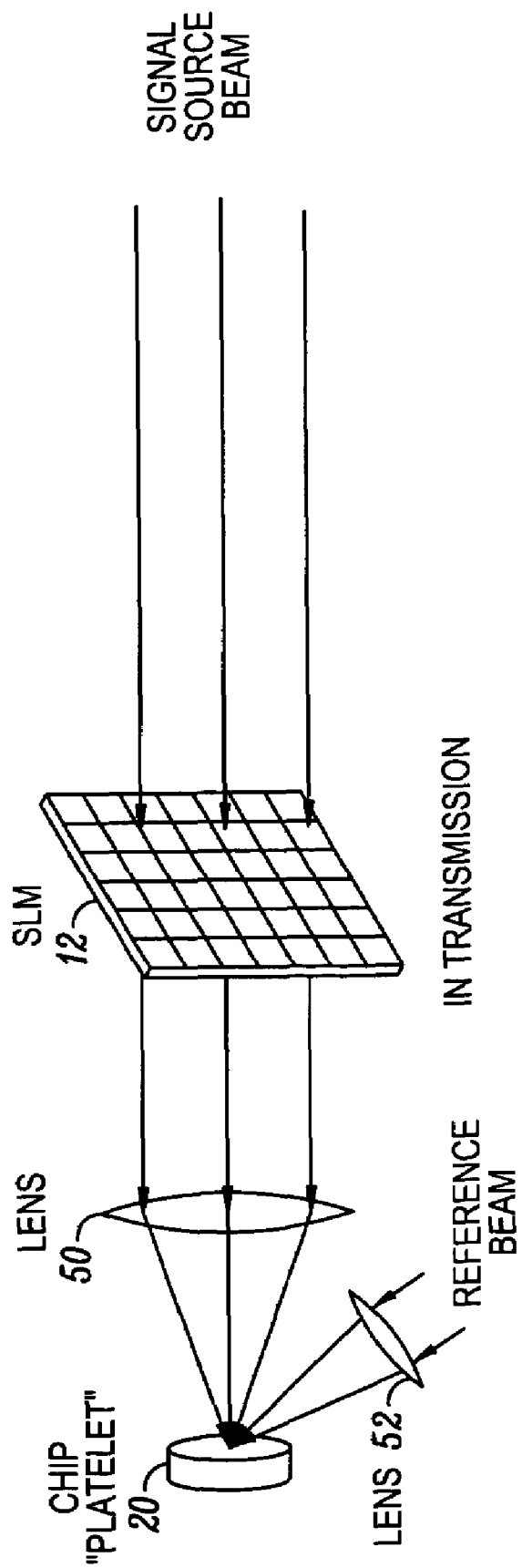
FIG. 3 shows a diagram of an apparatus for writing a code in transmission on an optical element according to the present invention.

FIG. 1 shows the apparatus generally indicated as 10 for writing a code on an optical element. The apparatus 10 includes a spatial light modulation device 12 having an n-dimensional code generally indicated as 14 configured or programmed thereon that responds to the signal beam 16, for providing a spatial light modulation signal containing the n-dimensional code 14; as well as a reference beam. The spatial light modulator 12 is arranged in relation to an optical element 20 so that the interference pattern generated between the spatial light modulation signal and the reference beam is written on or in the optical element 20 as a holographic image of the n-dimensional code 14. After the holographic image of the n-dimensional code 14 is written on or in the optical element, it takes the form of a holographically encoded optical element 20 having such an n-dimensional code. In FIG. 1, the n-dimensional code on the spatial light modulation device 12 is shown in the form of a 2-dimensional code having an array of pixels arranged in rows and columns.

The Spatial Light Modulation Device 12

The spatial light modulation (SLM) device 12 is known in the art and may include a digital light processor (DLP) or other suitable digitally modulated device (DMD) having a 2-dimensional array of micromirrors. The DLP may be programmable for configuring the 2-dimensional code thereon. In effect, the spatial light modulation device 12 is a digital mask with N×M attenuation elements that allows for multiple combinations/permutations of digital codes. The scope of the invention is not intended to be limited to the type, kind, shape or size of the spatial light modulation device 12. The scope of the invention is intended to include spatial light modulation devices both now known and later developed in the future.

In operation, the 2-dimensional array of micromirrors generally indicated as 22 is digitally coded to turn on or turn off to produce the 2-dimensional code 14. For example, a portion of the signal beam may be reflected in the direction of the optical element 20 when a particular micromirror is turned on, while another portion of the signal beam may be reflected in a direction away from the optical element 20 when a particular micromirror is turned off, or vice versa. As shown, the binomial state of the 2-dimensional array of micromirrors 22 corresponds to the 2-dimensional binomial code 14 written on or in the holographically encoded optical element 20.

The spatial light modulator may be controlled by a SLM controller 15 for providing a signal to turn on or turn off the micromirrors 22 to produce the 2-dimensional code 14. As a person skilled in the art would appreciate, the SLM controller 15 may be implemented in hardware, software, firmware, or some combination thereof to perform the functionality of the present invention. By way of example, a software embodiment would typically be microprocessor based, and include the suitable cooperation of the microprocessor, Random Access Memory (RAM), Read Only Memory (ROM), input/output devices, and address, control and data buses for coupling these components together. A person skilled in the art would be able to implement such an SLM controller 15 consistent with that shown and described herein to turn on or turn off the micromirrors 22 to produce the 2-dimensional code 14 on the SLM device 12.

By way of example, the spatial light modulation device 12 may include a known Digital Micromirror Device™ (DMD™) manufactured by Texas Instruments and described in the white paper entitled "Digital Light Processing™ for High-Brightness, High-Resolution Applications", white paper entitled "Lifetime Estimates and Unique Failure Mechanisms of the Digital Micromirror Device (DMD)", and news release dated September 1994 entitled "Digital Micromirror Display Delivering On Promises of 'Brighter' Future for Imaging Applications", which are incorporated herein by reference. The DMD device is monolithically fabricated by CMOS-like processes over a CMOS memory. Each micromirror typically includes, for example, an aluminum mirror, approximately 16 microns square, that can reflect light in one of two directions, depending on the state of the underlying memory cell. Rotation, flipping or tilting of the micromirror is accomplished through electrostatic attraction produced by voltage differences between the mirror and the underlying memory cell. With the memory cell in the "on" (1) state, the micromirror rotates or tilts approximately +10 degrees. With the memory cell in the "off" (0) state, the mirror tilts approximately −10 degrees.

Although the invention has been described as using an array of digital micromirrors to implement the spatial light modulator (SLM) device (or pixelating device) in the embodiments shown herein, it should be understood by those skilled in the art that any SLM that provides pixelated optical signal processing may be used, as described further below. Further, instead of using micromirrors with two reflective states or angles of reflection (e.g., ±10 degrees) as a pixel that reflects a portion of the light beam, the pixels may have one reflective state and the other state may be absorptive or transmissive. Alternatively, instead of the pixel having at least one state being reflective (which may provide other design advantages), the pixel may have one state being transmissive and the other state being absorptive. Alternatively, the pixel may have two transmissive or partially transmissive states that refract the incoming light out at two different angles. For each of various pixelating devices, the optics surrounding the pixelating device would be changed as needed to provide the same functions as that described for each of the embodiments herein for the different types of pixelated optical signal processing used.

Also, instead of the pixels having a square, diamond or rectangular shape, the pixels may have any other two or three-dimensional shapes, i.e., circle, oval, sphere, cube, triangle, parallelogram, rhombus, trapezoid.

The spatial light modulator is shown and described herein as a DLP device; however, the scope of the invention is intended to include other types of light modulator devices. For example, the spatial light modulator may also include a pixelating device, based on, for example, liquid crystal technology, such as a liquid crystal display (LCD). An LCD may provide a device having either one absorptive state and one reflective state, or one absorptive state and one transmissive state. The underlying principle of an LCD is the manipulation of polarized light (i.e., an optical channel). For example, the polarized light may be rotated by 90 degrees in one state of the liquid crystal and not rotated in another state. To provide an LCD having one absorptive state and one transmissive state, a polarizer is provided at each side of the liquid crystal, such that the polarization angles of the polarizers are offset by 90 degrees. A mirror can be added at one end to provide an LCD having one absorptive state and one reflective state.

One example of having a reflective state and a transmissive state is a variation on existing bubble jet technology currently produced by Agilent and Hewlett-Packard Co., and described in U.S. Pat. Nos. 6,160,928 and 5,699,462, respectively. In that case, when the bubble is in one state, it has total internal reflection; and when in the other state, it is totally transmissive. Also in that case, the pixels may not be square but circular or oval.

One example of having a transmissive state and an absorptive state is Heterojunction Acoustic Charge Transport (HACT) Spatial Light Modulator (SLM) technology, such as that described in U.S. Pat. No. 5,166,766, entitled "Thick Transparent Semiconductor Substrate, Heterojunction Acoustic Charge Transport Multiple Quantum Well Spatial Light Modulator", Grudkowski et al. and U.S. Pat. No. 5,158,420, entitled "Dual Medium Heterojunction Acoustic Charge Transport Multiple Quantum Well Spatial Light Modulator" to Grudkowski et al., provided the material used for the HACT SLM will operate at the desired operational wavelength. In that case, the pixels may be controlled by charge packets that travel along a surface acoustic wave that propagates along the device, where the size of the charge controls the optical absorption.

See also the following for other examples of the use of spatial light modulators: U.S. patent application Ser. No. 10/115,647, entitled "Dynamic Optical Filter Having a Spatial Light Modulator", filed Apr. 3, 2002, U.S. Patent Office Publication No. 2002-0176151 A1; U.S. patent application Ser. No. 10/159,370, entitled "Optical Channel Monitor" filed May 31, 2002, U.S. Patent Office Publication No. 2003-0007148 A1; U.S. Provisional Patent Application Ser. No. 60/332,318, entitled "Chromatic dispersion compensation device having an array of micromirrors", filed Nov. 16, 2001; U.S. Provisional Patent Application Ser. No. 60/325,065, entitled "Reconfigurable Optical Add/Drop Multiplexer having an Array of micromirrors", filed Sep. 25, 2001; U.S. Provisional Patent Application Ser. No. 60/325,068, entitled "Optical Cross-connect having an array of micromirrors", filed Sep. 21, 2001; U.S. Provisional Patent Application Ser. No. 60/325,066, entitled "Optical Channel monitor having an array of Micromirrors", filed Sep. 25, 2001; U.S. Provisional Patent Application Ser. No. 60/325,064, entitled "Optical Interleaver/deinterleaver device having an array of micromirrors", filed Sep. 25, 2001; U.S. Provisional Patent Application Ser. No. 60/344,585, entitled "Optical blocking filter having an array of micromirrors", filed Dec. 28, 2001; U.S. Provisional Patent Application Ser. No. 60/352,297, entitled "Multifunctional optical device having spatial light modulator", filed Jan. 28, 2002; U.S. patent application Ser. No. 10/115,648, entitled "Variable Optical Source", filed Apr. 3, 2002, U.S. Patent Office Publication No. 2002-0176149 A1; U.S. patent application Ser. No. 10/120,617, entitled "Adaptive filter/attenuator using pixelated reflector", filed Apr. 11, 2002, which are all hereby incorporated by reference in their entirety.

See also, U.S. Pat. No. 5,208,880 (Riza et al.); U.S. Pat. No. 6,222,954 (Riza et al.); and U.S. Pat. No. 6,263,123 (Bishop et al.), also all hereby incorporated by reference in their entirety.

The multiple combinations/permutations of digital codes on the 2-dimensional array of micromirrors include M sets of $2^N$ codes, and the total number of unique 2D image codes is $2^{NM}$ codes. For N=M=10, the number of codes is greater than $10^{30}$.

The 2-dimensional code 14 may also include one or more reference markers, e.g. a corner code or the like.

FIG. 2: Reading the 2-Dimensional Code

The present invention also includes a method and apparatus for reading the 2-dimensional code 14 (FIG. 1) on or in the holographically encoded optical element 20. In operation, as shown in FIG. 2, a reference beam from a reference beam source element 18 is provided on the holographically encoded optical element 20 in order to read the holographic image 30, consistent with known holographic reading and processing techniques. In FIG. 2, the holographic image 30 reflected from the holographically encoded optical element 20 contains the 2-dimensional code 14 that corresponds to the arrangement of the array of digitally encoded micromirrors 22 on the spatial light modulator device 12 shown in FIG. 1. The holographic image 30 may be projected on and read and/or processed by technology known in the art, including a charged coupled device (CCD) shown in FIG. 11 or other suitable optical reading device now known or later developed in the future. The scope of the invention is not intended to be limited to the use of any particular device for reading and/or processing the holographic image 30. The SLM may be any spatial light modulator that operates, for example, in reflection or transmission. Alternatively, the code and SLM maybe one dimensional (e.g. a single row of pixels). (See, for example, FIGS. 5 and 6 discussed below.)

The Holographically Encoded Optical Element 20

The present invention also includes the holographically encoded optical element 20 formed by performing the steps set forth using the method and apparatus described herein. The holographically encoded optical element 20 may be a bead, a chip, a block, a platelet or other suitable geometry either now known or later developed in the future. The holographically encoded optical element 20 may be made from any photosensitive material either now known or later developed in the future, including glass and polymer materials having an appropriate photosensitivity, that creates a refractive index variation in its substrate.

The holographically encoded optical element 20 may be microscopic in size having a length in a range of 1-1,000 microns or smaller; or for larger applications may have a length of 1.0-1,000 millimeters or more. The outer diameter may be as small as less than 1,000 microns, as well as in a range of 1.0 to 1,000 millimeters for larger applications. Using manufacturing techniques developed in conjunction with the development of the present invention, one optical fiber or substrate can be drawn and processed to produce hundreds of thousands, as well as even a million or more of unique holographically encoded optical element (also known as microbeads). The holographically encoded optical element 20 may include an optical substrate having the refractive index of the core is less than or equal to the cladding, or vice versa. The scope of the invention is not intended to be limited to the type, kind, shape or size of the holographically encoded optical element 20. The scope of the invention is intended to include optical substrates both now known and later developed in the future.

Applications, Uses, Geometries and Embodiments for the Encoded Element of the Present Invention Applications, uses, geometries and embodiments for the encoded element of the present invention may be the same as that described in the following cases which are all incorporated herein by reference in their entirety: U.S. patent application Ser. No. 10/661,234, filed Sep. 12, 2003, entitled "Diffraction Grating-Based Optical Identification Element"; U.S. patent application Ser. No. 10/661,031 filed Sep. 12, 2003, entitled "Diffraction Grating-Based Encoded Micro-particles for Multiplexed Experiments"; U.S. patent application Ser. No. 10/661,082, filed Sep. 12, 2003, entitled "Method and Apparatus for Labeling Using Diffraction Grating-Based Encoded Optical Identification Elements"; U.S. patent application Ser. No. 10/661,115, filed Sep. 12, 2003, entitled "Assay Stick"; U.S. patent application Ser. No. 10/661,836, filed Sep. 12, 2003, entitled "Method and Apparatus for Aligning Microbeads in order to Interrogate the Same"; U.S. patent application Ser. No. 10/661,254, filed Sep. 12, 2003, entitled "Chemical Synthesis Using Diffraction Grating-based Encoded Optical Elements"; U.S. patent application Ser. No. 10/661,116, filed Sep. 12, 2003, entitled "Method of Manufacturing of a Diffraction grating-based identification Element"; and U.S. patent application Ser. No. 10/763,995, filed Jan. 22, 2004, entitled, "Hybrid Random Bead/Chip Based Microarray", U.S. Provisional Patent Applications Ser. Nos. 60/609,583, 60/610,059 and 60/609,712, all filed Sep. 13, 2004; U.S. Provisional Patent Applications Ser. Nos. 60/611,205, 60/610,910, 60/610,833, 60/610,829, 60/610, 928, all filed Sep. 17, 2004 and U.S. Provisional Patent Application Ser. No. 60/611,676, filed Sep. 20, 2004; and U.S. patent applications Ser. No. 10/956,791, filed Oct. 1, 2004.

FIG. 3: In Transmission

By way of example, FIG. 3 shows an embodiment of the present invention, wherein the hologram or holographic image is written on the optical element 20 (shown as a chip "platelet") by passing a signal source beam through the SLM 12 in transmission, and passed through a lens 50 so as to form an interference pattern on the optical element 20 in relation to a reference beam passing through a lens 52. As shown, the SLM 12 is a 2-dimensional device having rows and columns of pixels.

Figure 4:
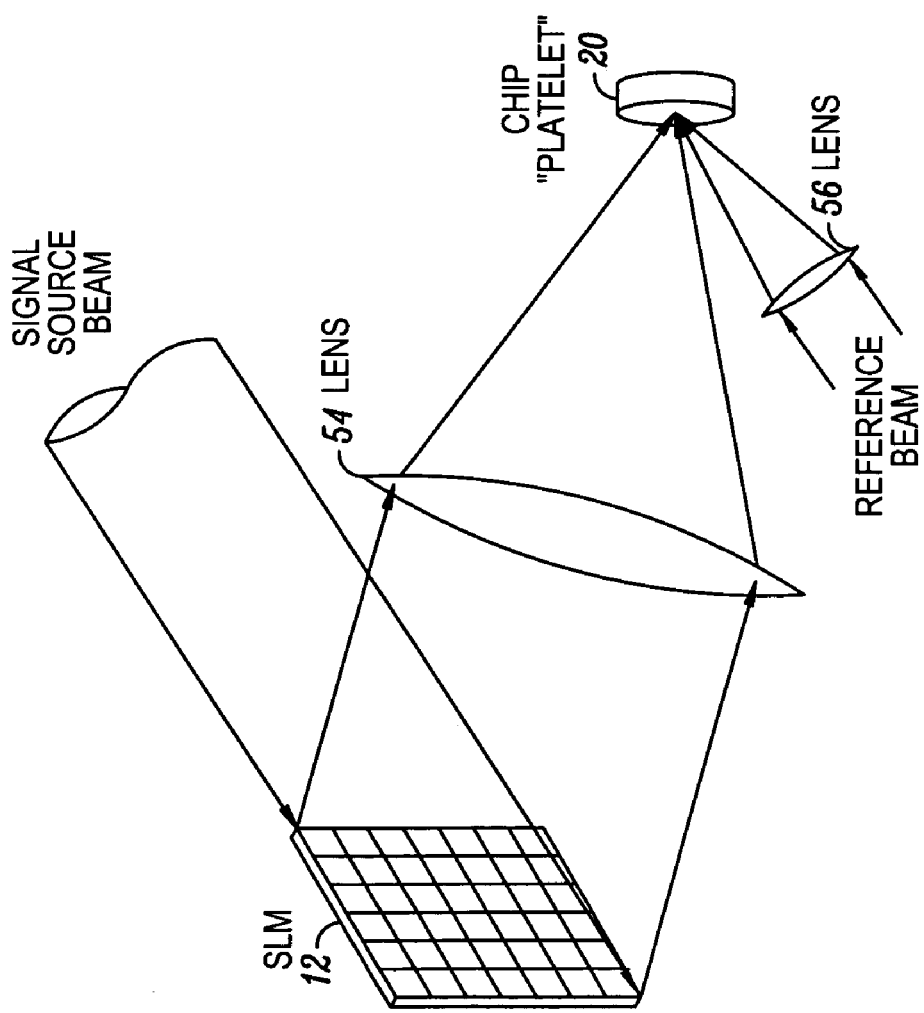
FIG. 4 shows a diagram of an apparatus for writing a code in reflection on an optical element according to the present invention.

FIG. 4: In Reflection

FIG. 4 shows an embodiment of the present invention, wherein the hologram or holographic image is written on the optical element 20 (shown as a chip "platelet") by bouncing the signal source beam off the SLM 12 in reflection, and passed through a lens 54 so as to form an interference pattern on the optical element 20 in relation to the reference beam which passes through a lens 56. As shown, the SLM 12 is a 2-dimensional device having rows and columns of pixels.

Figure 5:
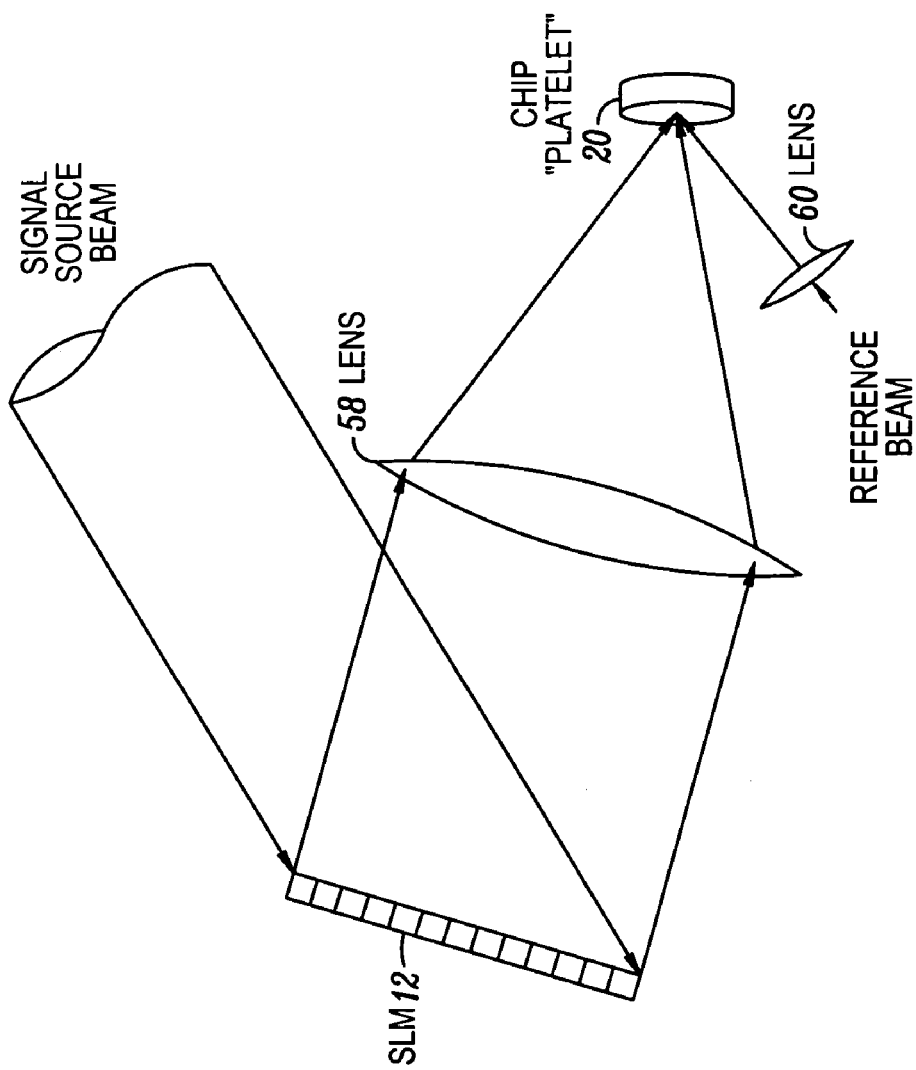
FIG. 5 shows a diagram of an apparatus for writing a 1-dimensional code in reflection on an optical element according to the present invention.

FIG. 5: 1-D, in Reflection

FIG. 5 shows an embodiment of the present invention, wherein the hologram or holographic image is written on the optical element 20 (shown as a chip "platelet") by bouncing the signal source beam off the SLM 12 in reflection, and passed through a lens 58 so as to form an interference pattern on the optical element 20 in relation to the reference beam which passes through a lens 60. As shown, the SLM 12 is a 1-dimensional device having either 1 row and n columns of pixels, or n row and 1 column of pixels.

Figure 6:
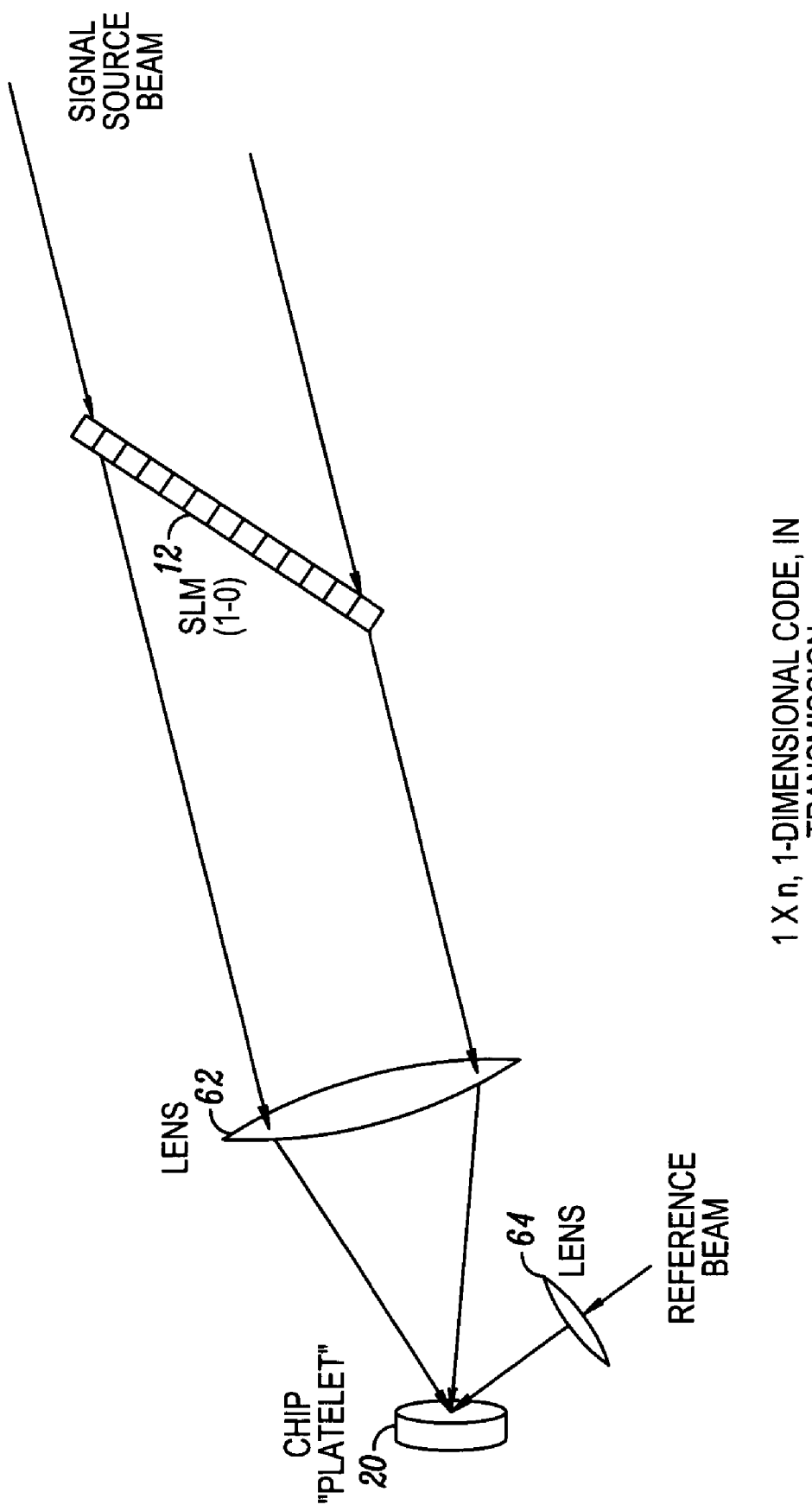
FIG. 6 shows a diagram of an apparatus for writing a 1-dimensional code in transmission on an optical element according to the present invention.

FIG. 6: 1-D, in Transmission

FIG. 6 shows an embodiment of the present invention, wherein the hologram or holographic image is written on the optical element 20 (shown as a chip "platelet") by passing the signal source beam through the SLM 12 in transmission, and passed through the lens 62 so as to form an interference pattern on the optical element 20 in relation to the reference beam which passes through a lens 64. As shown, the SLM 12 is a 1-dimensional device having either 1 row and n columns of pixels, or n row and 1 column of pixels.

Figure 7:
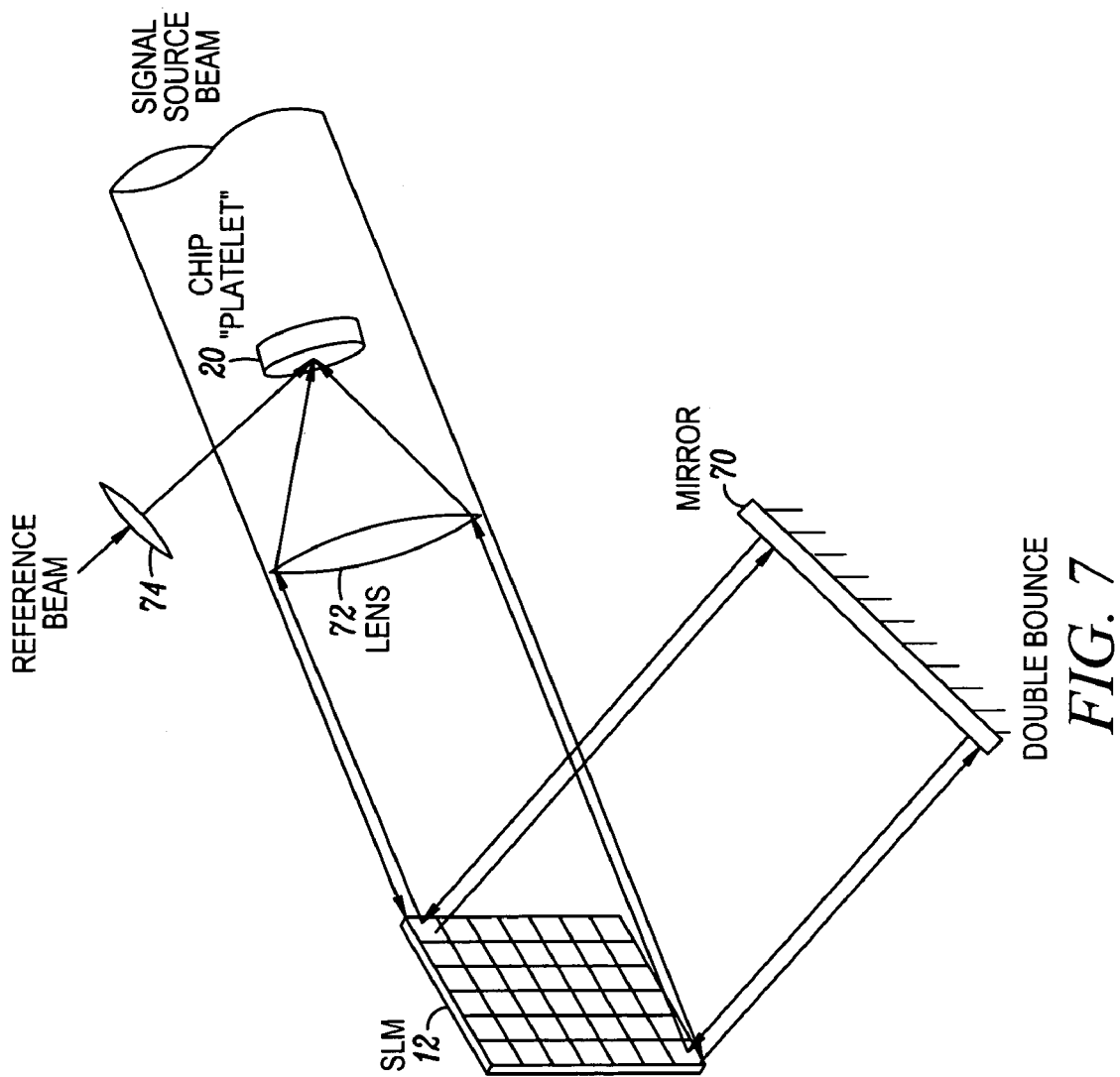
FIG. 7 shows a diagram of an apparatus for writing a 2-dimensional code on an optical element using a double bounce technique according to the present invention.

FIG. 7: Using Double Bounce

FIG. 7 shows an embodiment of the present invention, wherein light hits the SLM 12 one or more times. This may enhance the holographic image written into the substrate or particle or for other purposes.

As shown, the source signal beam is reflected off the SLM 12, bounced off a mirror 70 back to the SLM 12, reflected off the SLM 12, passed through a lens 72 so as to form an interference pattern on the optical element 20 (shown as a chip "platelet") in relation to the reference beam which passes through a lens 74, causing the hologram or holographic image to be formed therein.

Figure 8:
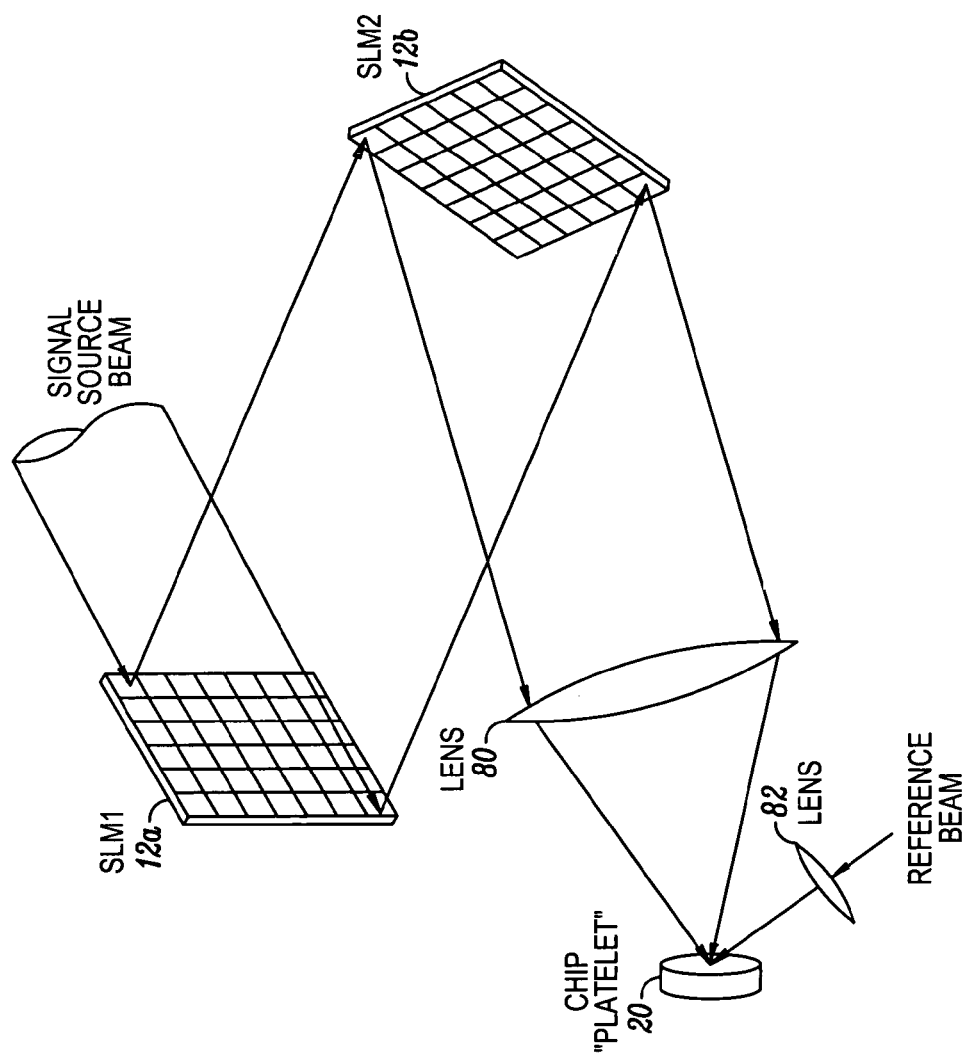
FIG. 8 shows a diagram of an apparatus for writing a 2-dimensional code on an optical element using more than one SLM according to the present invention.

FIG. 8: Using Multiple SLMs

FIG. 8 shows an embodiment of the present invention, wherein light hits one or more SLMs to create alternate holograms or hologram features or enhance various aspects of the holographic image.

As shown, the source signal beam is reflected off a first SLM1 12a, reflected off a second SLM2 12b, passed through a lens 80 so as to form an interference pattern on the optical element 20 (shown as a chip "platelet") in relation to the reference beam which passes through a lens 82, causing the hologram to be formed therein.

Figure 9:
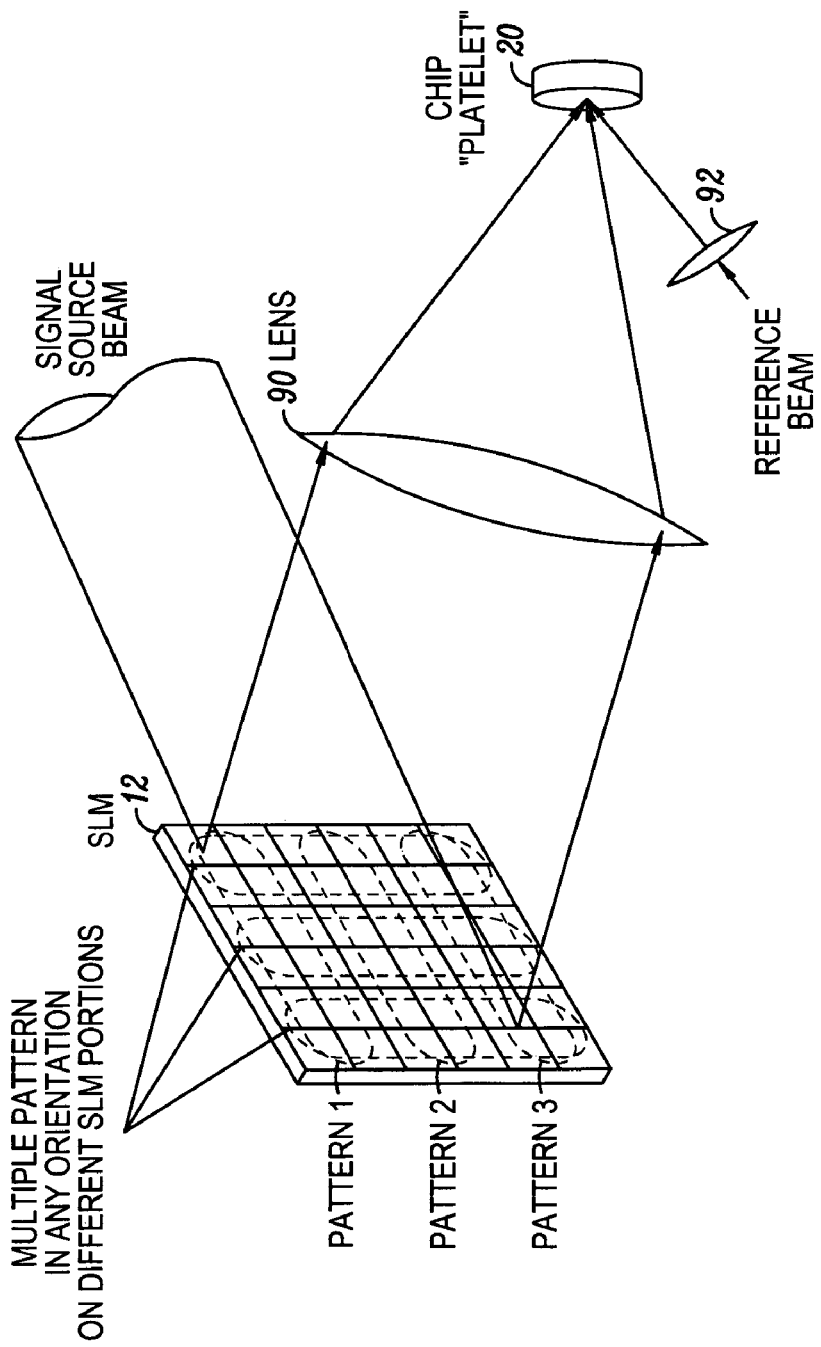
FIG. 9 shows a diagram of an apparatus for writing a 2-dimensional code on an optical element using more than one pattern on the SLM according to the present invention.

FIG. 9: Pixelated Signal and Reference Source Beams

The SLM can have multiple patterns or codes arranged in any orientation, as shown, including horizontal, vertical, diagonal, etc. In effect, instead of using the entire SLM, any portion(s) of the SLM may be used. Different patterns may be created by different portions of the SLM sequentially or simultaneously.

As shown, the source signal beam is reflected off the SLM 12 having one or more patterns, pattern 1, pattern 2, pattern 3 (up to pattern n) arranged thereon, passed through a lens 90 so as to form an interference pattern on the optical element 20 (shown as a chip "platelet") in relation to the reference beam which passes through a lens 92, causing the hologram to be formed therein.

Figure 10:
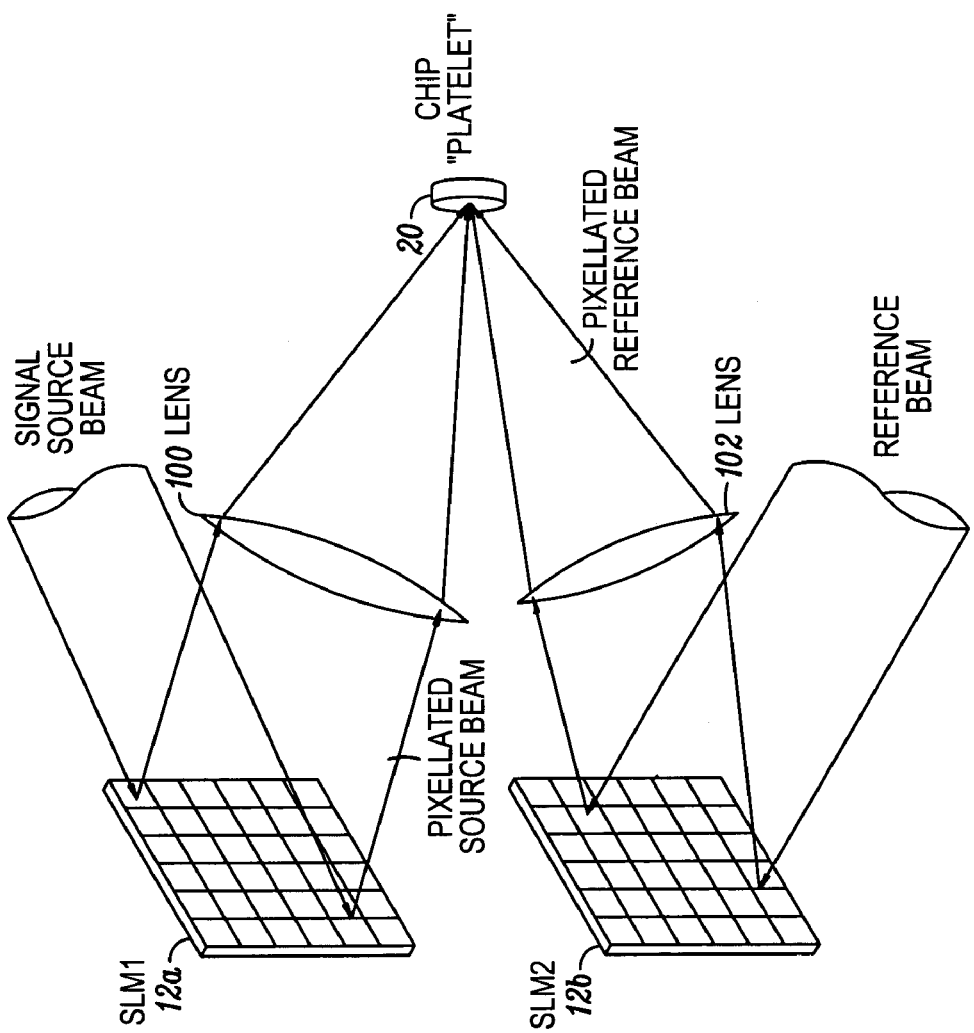
FIG. 10 shows a diagram of an apparatus for writing a 2-dimensional code on an optical element using pixelated reference and signal source beams according to the present invention.

FIG. 10: Multiple SLM Patterns or Codes

The reference beam may be pixelated using a second SLM2 or an unused portion of the first SLM1. In that case, when reading the code the same pixelated reference beam should be used. This can provide another level of encryption or encoding if desired or beam shaping. Also, in that case the source beam need not be pixelated if desired.

As shown, the source signal beam is reflected off a first SLM1 12a for providing a pixelated source beam, which is passed though a lens 100, the reference beam is reflected off a second SLM2 12b for providing a pixelated reference beam, which is passed though a lens 102, the pixelated source beam and the pixelated reference beam form an interference pattern on the optical element 20 (shown as a chip "platelet") causing the hologram to be formed therein.

Figure 11:
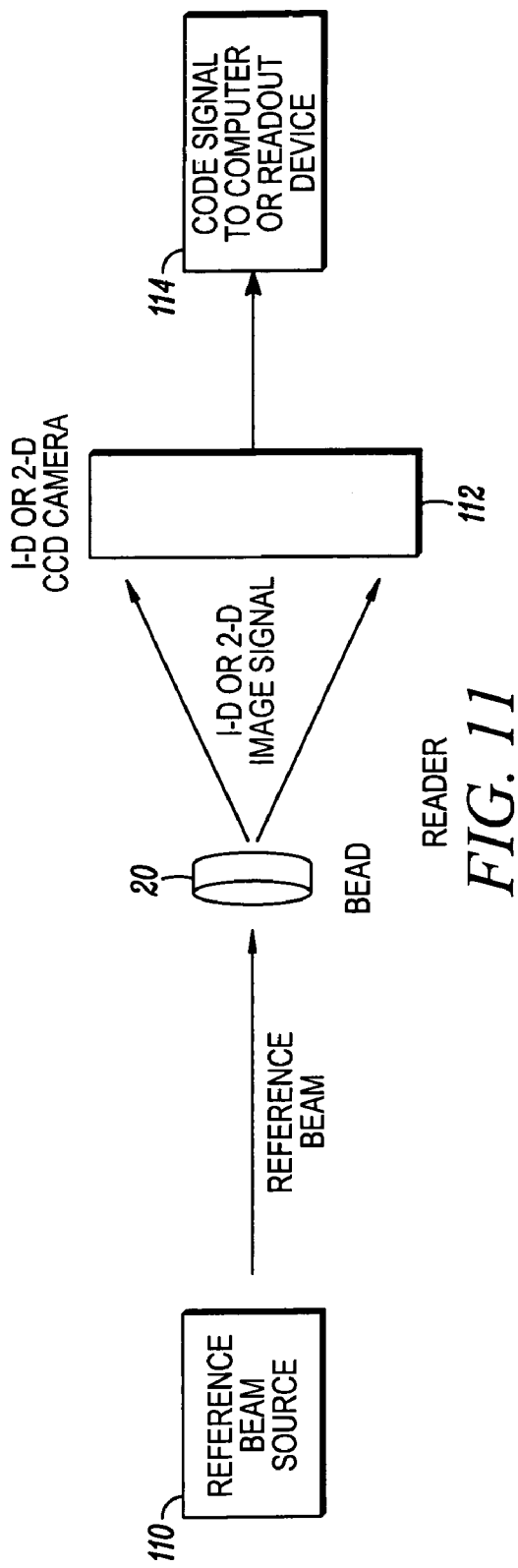
FIG. 11 shows a diagram of an apparatus for reading a 2-dimensional code on an optical element according to the present invention.

FIG. 11: The Reader

FIG. 11 shows by way of example a reader of an element or bead having a hologram written therein. (See also FIG. 2.) As shown, the reference beam source 110 provides a reference beam on the optical element or bead 20 so that a 1-D or 2-dimensional image signal is formed and generated onto a 1-D or 2-D CCD camera 112, which provides a code signal to a computer or readout device 114.

As a person skilled in the art would appreciate, the computer or readout device 114 may be implemented in hardware, software, firmware, or some combination thereof to perform the functionality of the present invention. By way of example, a software embodiment would typically be microprocessor based, and include the suitable cooperation of the microprocessor, Random Access Memory (RAM), Read Only Memory (ROM), input/output devices, and address, control and data buses for coupling these components together. A person skilled in the art would be able to implement such a computer or readout device consistent with that shown and described herein to determine or print out the holographic image having the n-dimensional code according to the invention.

Figure 12:
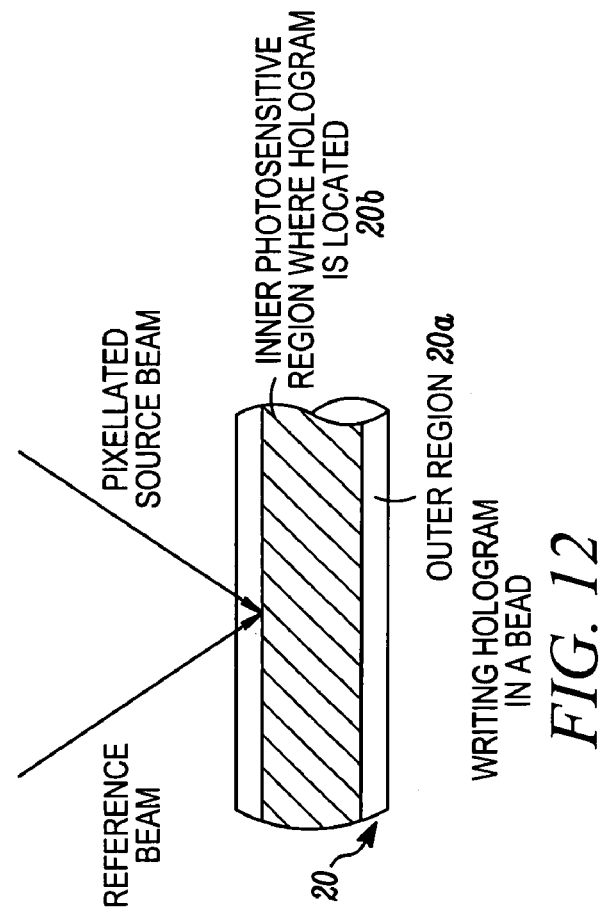
FIG. 12 shows a diagram of an apparatus for writing a 2-dimensional code on a bead according to the present invention.

FIG. 12: Hologram Writing in a Bead

FIG. 12 shows a reference beam and a pixelated light source or beam which pass through an outer region 20a, and interferes to form the hologram in an inner photosensitive region 20b of the optical element 20.

Figure 13:
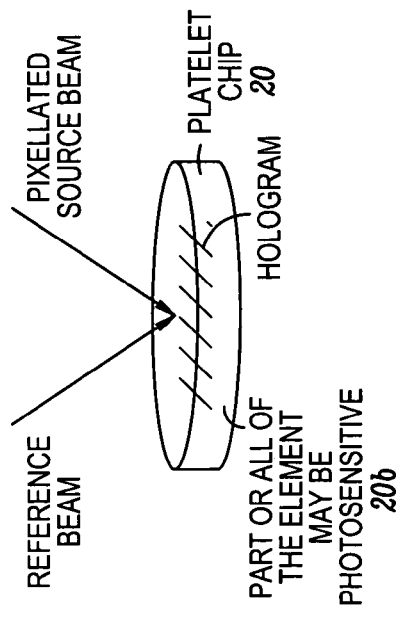
FIG. 13 shows a diagram of an apparatus for writing a 2-dimensional code on a chip according to the present invention.

FIG. 13: Hologram Writing in a Chip

FIG. 13 shows a reference beam and a pixelated light source which interferes to form the hologram on or in an inner photosensitive region 20b of a plate chip, bead or other suitable element 20.

Figure 14:
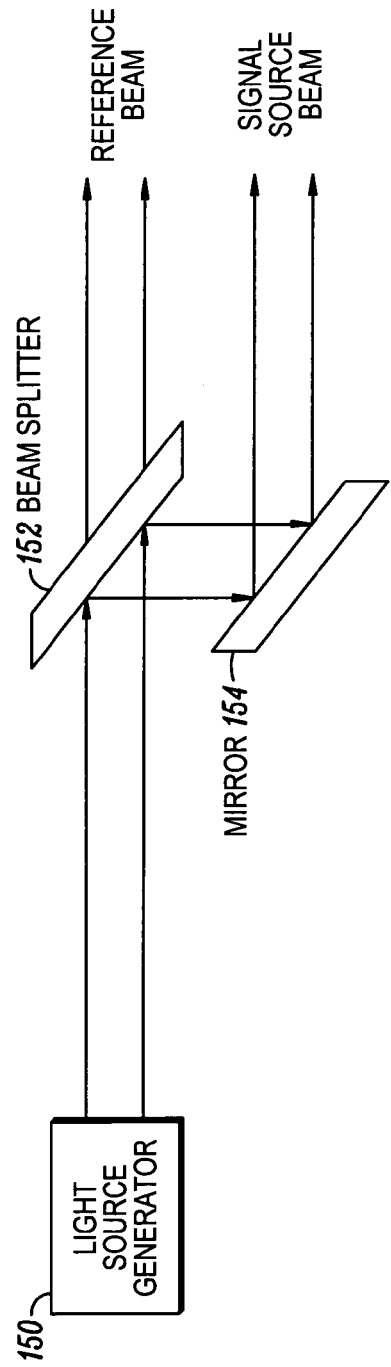
FIG. 14 shows a diagram of a known apparatus for generating coherent reference and signal source beams for using with the present invention.

FIG. 14: The Signal and Reference Beam Sources

As a person skilled in the art would appreciate, a reference beam and a signal beam would typically be produced by a split coherent beam of radiation, which is a very well known technique in the art. For example, the reference beam may be split using known optical techniques to form the signal beam to produce and maintain the coherency of the light. The signal and reference beam source or sources form part of well known devices in the art, and would typically include a laser or light source generator device 150 and associated optical arrangement that are known in the art, as shown by way of example in FIG. 14. In FIG. 14, the suitable light source generator takes the form of a reference laser 150, which is split by a beam splitter 152, so as to form a reference beam and a signal source beam, which is reflected of a mirror 154 or other suitable reflecting device. The scope of the invention is not intended to be limited to any particular type or kind of device or apparatus for generating the reference beam and the signal beam; and is intended to include devices and apparatus now known and later developed in the future.

Computer Programs and Other Data Processing Methods

Various aspects of the present invention may be conducted in an automated or semi-automated manner, generally with the assistance of well-known data processing methods. Computer programs and other data processing methods well known in the art may be used to store information including e.g. microbead identifiers, probe sequence information, sample information, and binding signal intensities. Data processing methods well known in the art may be used to read input data covering the desired characteristics.

Applications

The invention may be used in many areas such as drug discovery, functionalized substrates, biology, proteomics, combinatorial chemistry, DNA analysis/tracking/sorting/tagging, as well as tagging of molecules, biological particles, matrix support materials, immunoassays, receptor binding assays, scintillation proximity assays, radioactive or non-radioactive proximity assays, and other assays, (including fluorescent, mass spectroscopy), high throughput drug/genome screening, and/or massively parallel assay applications. The invention provides uniquely identifiable beads with reaction supports by active coatings for reaction tracking to perform multiplexed experiments.

SCOPE OF THE INVENTION

The dimensions and/or geometries for any of the embodiments described herein are merely for illustrative purposes and, as such, any other dimensions and/or geometries may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

Moreover, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:

1. A method for writing a different code on or in each of a plurality of optical elements, comprising:
    generating an interference pattern between a reference beam and a signal beam reflected off a spatial light modulation device having an n-dimensional code configured thereon; and
    writing the interference pattern on or in the optical element as a holographic image of the n-dimensional code, wherein the optical elements comprise microbeads or a substrate that is processed to produce microbeads.

2. A method according to claim 1, wherein n is a number greater than or equal to 1.

3. A method according to claim 1, wherein the spatial light modulation device includes a digitally modulated device (DMD) having a 1 or 2-dimensional array of micromirrors.

4. A method according to claim 3, wherein the DMD is programmable.

5. A method according to claim 4, wherein a portion of the signal beam may be reflected in the direction of the optical element when a particular micromirror is turned on, while another portion of the signal beam may be reflected in a direction away from the optical element when a particular micromirror is turned off.

6. A method according to claim 4, wherein a binomial state of the 2-dimensional array of micromirrors of the DMD corresponds to the 2-dimensional binomial code written on or in the optical element.

7. A method according to claim 4 wherein the DMD is a digital light processor (DLP).

8. A method according to claim 1, wherein the spatial light modulation device is a digital mask with N×M attenuation elements that allows for multiple combinations/permutations of digital codes.

9. A method according to claim 1, wherein the spatial light modulation device has pixels that may have one reflective state and the other state may be absorptive or transmissive, or that may have one state being transmissive and the other state being absorptive, or that may have two transmissive or partially transmissive states that refract the incoming light out at two different angles, or some combination thereof.

10. A method according to claim 1, wherein the spatial light modulation device has pixels that have two or three-dimensional shapes.

11. A method according to claim 1, wherein the optical element includes one of a microbead, a chip, a block, and a platelet.

12. A method according to claim 1, wherein the optical element has a maximum dimension of less than 1000 microns.

13. A method according to claim 1, wherein a material of the optical element is a photosensitive material.

14. A method according to claim 1, wherein the method includes a step of providing the reference beam on the bead in order to read the holographic image off the optical element.

15. A method according to claim 1, wherein the interference pattern is written in or on the optical element in the form of a diffraction grating.

16. A method according to claim 1, wherein the method includes bouncing light off the spatial light modulation device more than one time in order to form the holographic image.

17. A method according to claim 1, wherein the method includes using multiple spatial light modulation devices.

18. A method according to claim 1, wherein the method includes using different portions of the spatial light modulation device sequentially or simultaneously in order to form the holographic image.

19. A method according to claim 1, wherein the reference beam is pixelated using a second spatial light modulation device or an unused portion of the first spatial light modulation device, so that when the n-dimensional code is read the same pixelated reference beam is used.

20. A bead having an n-dimensional code formed by the steps according to the method recited in claim 1.

21. A bead according to claim 20, wherein the spatial light modulation device is a digital mask with N×M attenuation elements that allows for multiple combinations/permutations of digital codes.

22. A bead according to claim 20, wherein the holographically encoded bead has a maximum outer dimension less than 1,000 microns.

23. A bead according to claim 20, wherein a material of the optical element includes a photosensitive material.

24. A bead according to claim 20, wherein the method includes using multiple spatial light modulation devices.

25. A bead according to claim 20, wherein n is a number greater than or equal to 1.

26. A bead according to claim 20, wherein the spatial light modulation device includes a digitally modulated device (DMD) having a 1 or 2-dimensional array of micromirrors.

27. A method according to claim 1 wherein the holographic image of the n-dimensional code identifies the optical element.

28. An optical arrangement for writing a different code on or in each of a plurality of optical elements, comprising:
    a light source for providing a reference beam; and a spatial light modulation device having an n-dimensional code configured thereon that responds to a signal beam for providing a spatial light modulation signal containing the n-dimensional code;

the spatial light modulation device and the light source being arranged in relation to the optical element so that an interference pattern generated between the spatial light modulation signal and the reference beam is written on or in the optical element as a holographic image of the n-dimensional code, wherein the optical elements comprise microbeads or a substrate that is processed to produce microbeads.

29. An optical arrangement according to claim 28, wherein n is a number greater than or equal to 1.

30. An optical arrangement according to claim 28, wherein the spatial light modulation device includes a digitally modulated device (DMD) having a 1 or 2-dimensional array of micromirrors.

31. An optical arrangement according to claim 30, wherein a binomial state of the 2-dimensional array of micromirrors corresponds to the 2-dimensional binomial code written on or in the optical element.

32. An optical arrangement according to claim 28, wherein the spatial light modulation device is a digital mask with N×M attenuation elements that allows for multiple combinations/permutations of digital codes.

33. An optical arrangement according to claim 28, wherein the spatial light modulation device has pixels that may have one reflective state and the other state may be absorptive or transmissive, or that may have one state being transmissive and the other state being absorptive, or that may have two transmissive or partially transmissive states that refract the incoming light out at two different angles, or some combination thereof.

34. An optical arrangement according to claim 28, wherein the optical element includes one of a microbead, a chip, a block, and a platelet.

35. An optical arrangement according to claim 28, wherein the optical element is microscopic in size having a maximum dimension of less than 1,000 microns.

36. An optical arrangement according to claim 28, wherein a material of the bead is a photosensitive material.

37. An optical arrangement according to claim 28, wherein the reference beam is provided on the optical element in order to read the holographic image off the optical element.

38. An optical arrangement according to claim 28, wherein the interference pattern is written in or on the optical element in the form of a diffraction grating.

39. An optical arrangement according to claim 28, wherein the optical arrangement bounces light off the spatial light modulation device more than one time in order to form the holographic image.

40. An optical arrangement according to claim 28, wherein the optical arrangement includes multiple spatial light modulation devices.

41. A method according to claim 1, wherein the spatial light modulation device has multiple patterns or codes.

42. An optical arrangement according to claim 28, wherein the reference beam is pixelated using a second spatial light modulation device or an unused portion of the first spatial light modulation device, so that when the n-dimensional code is read the same pixelated reference beam is used.

* * * * *

UNITED STATES PATENT AND TRADEMARK OFFICE
CERTIFICATE OF CORRECTION

PATENT NO.        : 7,604,173 B2
APPLICATION NO. : 11/281910
DATED             : October 20, 2009
INVENTOR(S)       : Kersey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 935 days.

Signed and Sealed this

Fourteenth Day of December, 2010

David J. Kappos
*Director of the United States Patent and Trademark Office*